United States Patent
Serrano et al.

(10) Patent No.: US 12,554,338 B1
(45) Date of Patent: Feb. 17, 2026

(54) WIRELESS COMMUNICATION PROTOCOL FOR KEY ACTIVATION WITHOUT AN ACKNOWLEDGEMENT

(71) Applicant: Logitech Europe S.A., Lausanne (CH)

(72) Inventors: Daniel Blasco Serrano, Geneva (CH); Philippe Chazot, Saint-Jorioz (FR); David Farcy, Epalinges (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 19/092,167

(22) Filed: Mar. 27, 2025

(51) Int. Cl.
*G06F 3/02* (2006.01)
*A63F 13/31* (2014.01)
*G06F 3/023* (2006.01)
*G06F 3/038* (2013.01)
*G06F 3/0354* (2013.01)

(52) U.S. Cl.
CPC .......... *G06F 3/0231* (2013.01); *A63F 13/31* (2014.09); *G06F 3/038* (2013.01); *G06F 3/03543* (2013.01); *G06F 2203/0384* (2013.01)

(58) Field of Classification Search
CPC .... G06F 3/0231; G06F 3/038; G06F 3/03543; G06F 2203/0384; A63F 13/31
See application file for complete search history.

(56) References Cited

U.S. PATENT DOCUMENTS

| | | | |
|---|---|---|---|
| 10,781,181 B2* | 9/2020 | Evans | C07D 413/06 |
| 10,869,111 B2* | 12/2020 | Chazot | H04B 1/38 |
| 2023/0169019 A1* | 6/2023 | Cannata | G06F 13/102 |
| | | | 710/105 |
| 2024/0334246 A1* | 10/2024 | Chazot | G06F 3/0362 |

* cited by examiner

*Primary Examiner* — Pegeman Karimi
(74) *Attorney, Agent, or Firm* — Kilpatrick Townsend & Stockton LLP

(57) ABSTRACT

An input device detects a key press or release and when the same key has not been pressed or released since a last acknowledgement, a no-acknowledgement packet with key data for that period and any other key data since the last acknowledgement is wirelessly transmitted to the host. When the same key has been pressed or released since a last acknowledgement, an acknowledgement request in a packet with key data for that period and any other accumulated key data is wirelessly transmitted to the host. At a maximum delay time without requesting an acknowledgement, an acknowledgment request packet is transmitted. At a threshold number of key events, an acknowledgment request packet is transmitted.

20 Claims, 14 Drawing Sheets

| SOF | Address | Control | HID Payload | MIC | CRC |

| # | Field | Description |
|---|---|---|
| 1 | SOF | Start of frame |
| 2 | Address | Address of the message |
| 3 | Control<br>- Length<br>- Flow Control<br>- ACK/NOACK | Packet control field<br>Length of the payload<br>Flow control (ensure no reports are lost or duplicated)<br>Flag indicating an acknowledge is requested on not |
| 4 | HID Payload | Upper layer payload |
| 5 | MIC | Message integrity check (Verify the message has not been altered and correctly encrypted) |
| 6 | CRC | CRC MAC layer (calculated over the address, Packet Control Field, Payload and MIC) |

FIG. 3B

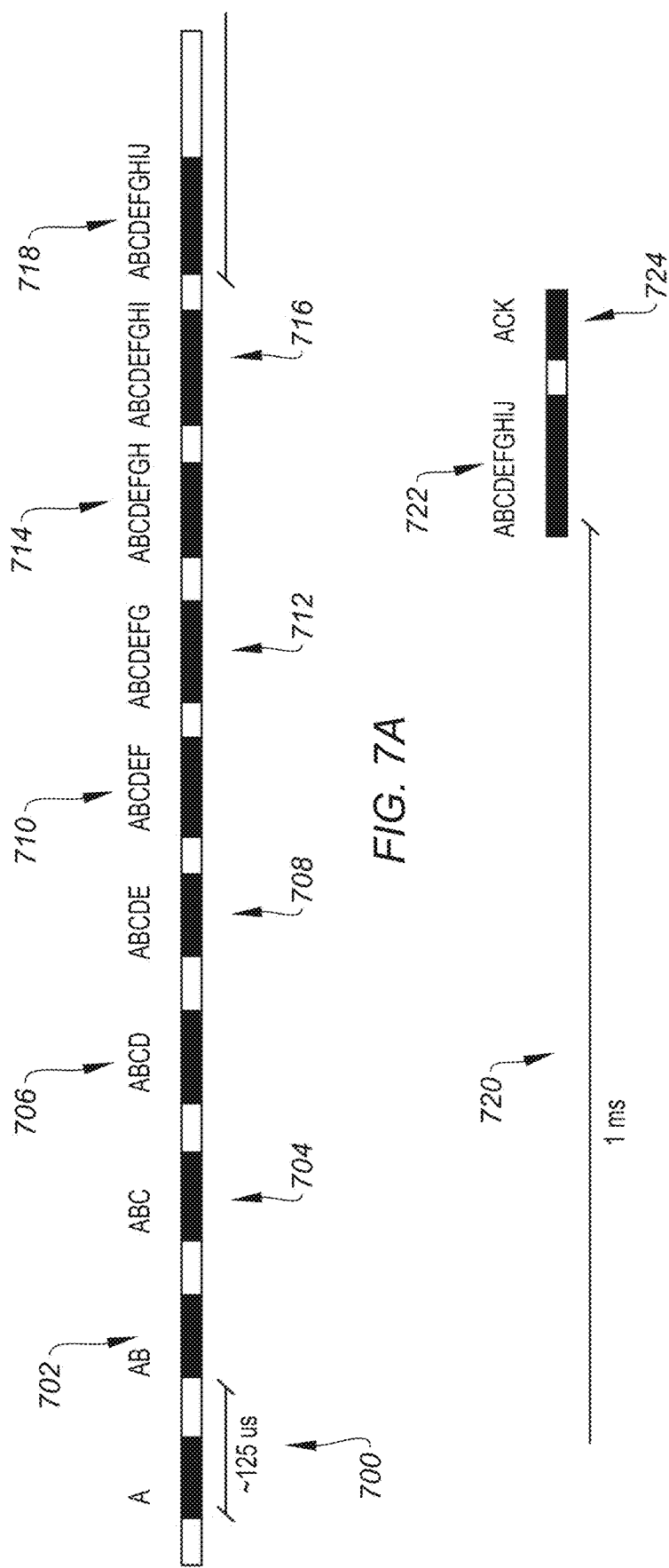

WIRELESS COMMUNICATION PROTOCOL FOR KEY ACTIVATION WITHOUT AN ACKNOWLEDGEMENT

CROSS-REFERENCES TO RELATED APPLICATIONS

This application is related to co-pending and co-owned U.S. Non-provisional application Ser. No. 18/191,828 filed on Mar. 28, 2023, titled "WIRELESS COMMUNICATION PROTOCOL HAVING A METHOD FOR DETERMINING USE OF DATA ACKNOWLEDGEMENT", which is hereby incorporated by reference in its entirety for all purposes.

FIELD

The described embodiments relate generally to host devices that are configured to communicate with one or more peripheral electronic devices via a wireless communications interface. More particularly, the present embodiments relate to wireless communication protocol acknowledgements.

BACKGROUND

Currently there are a wide variety of peripheral electronic devices or Human Interface Devices (HID) that are configured to communicate with a host device including mice, keyboards, headsets, trackballs and the like. Many of these peripheral devices employ wireless communications protocols to provide the user with flexibility and convenience, however traditional wireless communications protocols can experience a relatively significant time delay between when a user interacts with a peripheral device and when the host recognizes the interaction (also referred to as "latency" herein), especially when multiple peripheral devices are used. In some applications, such as for example competitive gaming, peripheral devices and associated communication protocols having reduced latency are required.

HID devices send a standard packet, chosen and initialized upon connection to a host, with fields for button presses, displacement movement, etc. Currently an acknowledgement is requested and sent for each packet when wireless communications are used. If no acknowledgement is received within a period of time, the HID may resend or may switch channels. Another approach used in some remote controls, for instance, is to simply send the packet multiple times so that it is more likely that at least one of the duplicated packets will be received (e.g., an infrared remote control where instead of an acknowledgment the user sees the key displayed on the screen and thus knows it was received, and if not, will press the button again). This consumes bandwidth and power, and is one of the reasons there can be interference between devices communication over the same wireless channel, requiring initializing and communicating over another channel.

Unless otherwise indicated herein, the materials described in this section are not prior art to the claims in this application and are not admitted to be prior art by inclusion in this section.

BRIEF SUMMARY OF THE INVENTION

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

Embodiments provide a method for wireless communications between an input device and a host. The input device detects a key press or release and determines whether the same key has been pressed or released since a last acknowledgement. When the same key has not been pressed or released since a last acknowledgement, a no-acknowledgement packet with key data for that period and any other key data since the last acknowledgement is wirelessly transmitted to the host. When the same key has been pressed or released since a last acknowledgement, an acknowledgement request in a packet with key data for that period and any other accumulated key data since the last acknowledgement is wirelessly transmitted to the host. At a maximum delay time without requesting an acknowledgement, an acknowledgment request packet including all the key presses since the last acknowledgement is transmitted. At a threshold number of key events without requesting an acknowledgement, an acknowledgment request packet including all the key presses and releases since the last acknowledgement is transmitted.

Embodiments provide a maximum delay time with a lowest value of twice the period of transmission (250 μs in case of 8 Khz reporting rate), and a highest value of 16 periods of transmission (2 ms in case of 8 Khz reporting rate) in one embodiment. In one embodiment, the maximum delay is one millisecond. The threshold number of key events without requesting an acknowledgement is between two and sixteen, and is ten in one embodiment. The period is 250 microseconds or less, corresponding to 4 kHz or faster, and in one embodiment the period is 125 microseconds, corresponding to 8 kHz.

When only displacement data is detected since a last acknowledgement, a no-acknowledgement packet with the displacement data is sent, thus providing no acknowledgement packets for both keys and displacement. Both key and displacement data are sent to the host without an acknowledgement request, whether it is key data alone in a period, displacement data alone, or a combination of the two. When no key has been pressed or released in a period, and there is no new displacement, no packet is transmitted to the host during that period. The size of the no-acknowledgement packet is varied with the number of key presses and releases. Alternately, for noisy embodiments, redundant accumulated key press and release packets are sent when no key has been pressed or released since a last transmission. The number of redundant transmissions in a noisy channel correspond to an amount of noise detected on a transmission channel.

No Acknowledgement Packets for HID Displacement Data.

In certain embodiments, a method for wireless communications between an input device and a host further comprises detecting, by the input device, a plurality of types of inputs, including displacement data and other input data. When only displacement data is detected in a first period of time, a no-acknowledgement packet is generated with the displacement data. The no-acknowledgement packet is wirelessly transmitted to the host.

In embodiments, accumulated displacement data is transmitted in subsequent periods of time, such that an $n^{th}$ period of time no-acknowledgement packet includes first displacement data from the first period of time and all displacement data up to the $n^{th}$ period of time. After a threshold number of periods of time with only displacement data, an acknowledgment request is transmitted.

Reduced Size Packet

In certain embodiments, the input device detects a plurality of types of inputs, including displacement data and key press and release data. A reduced-size packet is generated without fields not needed for the time period. Thus, the number of bits for the displacement data is chosen depending on the amount of displacement, and the number of fields for key presses and releases is chosen for the accumulated number detected since a last acknowledgement. The reduced-size packet is wirelessly transmitted to the host.

In further embodiments, when only displacement data is detected in a period of time, a reduced-size packet is generated with the displacement data while eliminating packet fields corresponding to the other input data. When other input data is detected in the period of time, a data packet for the other input data is generated with a packet field for the other input data and is wirelessly transmitted to the host. The displacement data includes at least one of x-y displacement data, wheel rotation data and cursor button data. In other embodiments, the displacement data includes keyboard cursors, a joystick or mini-joystick, a D-pad or an accelerometer or tilt sensor output, or a steering wheel angle. In embodiments, the "other input data" includes a button or key activation.

In some implementations, a transceiver in communication with the host receives the reduced-size packet and converts the reduced-size packet into a standard packet including fields for the other input data. The standard packet is then transmitted to the host.

BRIEF DESCRIPTION OF THE DRAWINGS

The features of the various embodiments described above, as well as other features and advantages of certain embodiments of the present disclosure will be more apparent from the following detailed description taken in conjunction with the accompanying drawings.

FIG. 3A illustrates packet format, according to certain embodiments. FIG. 3B shows a table 300 showing a packet format for an HID input device, according to certain embodiments.

FIGS. 7A-7B illustrates a method for transmitting key data without an acknowledgement for every key press, and without losing data, according to embodiments.

DETAILED DESCRIPTION OF THE INVENTION

Aspects of the present disclosure relate generally to electronic devices, and more particularly to systems and methods for wireless communication protocol having a method for determining use of data acknowledgement, according to certain embodiments.

In the following description, various examples of communication protocols having a method for determining use of data acknowledgement and/or reduced packet size for displacement data are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 1:
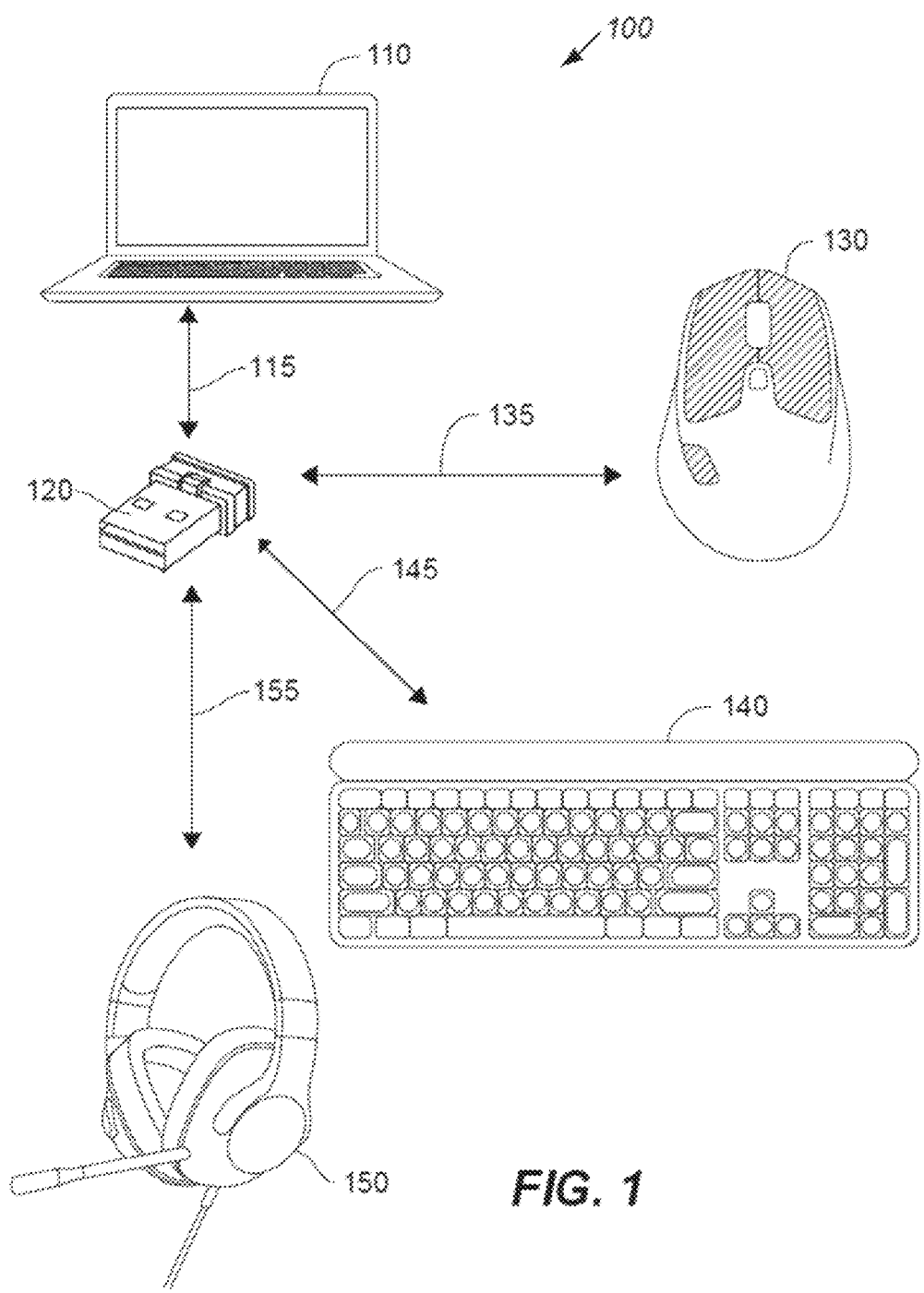
FIG. 1 shows a system including a host computing device that can be coupled to a plurality of peripheral computer devices via a wireless transceiver, according to certain embodiments.

The following high-level summary is intended to provide a basic understanding of some of the novel innovations depicted in the figures and presented in the corresponding descriptions provided below. Aspects of the invention relate to various novel communication protocols having a method for determining use of data acknowledgement (ACK) based on input data type for high report rate communication that can be well-suited for modern computing systems that run software with demanding operating requirements, such as competitive gaming systems. Over the last few decades, the advent of wireless communication protocols like Bluetooth® and BLE® has spurred innovation in connectivity between host computing devices and computer peripheral devices such that most peripheral devices have migrated from hard-wired connections to the host to wireless connections to the host. In many systems, the wireless communication protocols associated with wireless connections may be implemented over a Universal Serial Bus (USB) connected network, which may include multiple peripheral devices all communicating through a wireless USB hub (e.g., dongle) to a host computer device, as would be appreciated by one of ordinary skill in the art with the benefit of this disclosure (e.g., as shown in FIG. 1).

Although wireless connections offer improved flexibility and convenience for the user, some video game applications require relatively fast player response times and conventional wireless communication protocols (e.g., BLE) often do not provide acceptable performance metrics (e.g., computer mouse report latency and report rate, keystroke report latency and report rate) for the more discerning of gamers in the higher echelons of competitive e-sports.

For example, the delay from the time a user interacts with a mouse to the time the host registers the interaction "latency" is often used as a performance benchmark. A related common performance benchmark is the rate at which the device reports to the host (i.e., "report rate"), which is often desired to be at 1000 reports or more per second. In some embodiments, a wireless human input device (HID) peripheral device transceiver can be configured to wirelessly transfer data between the HID input device and host transceiver using an ACK/no ACK method and transmit data packets using an accumulation method.

When a peripheral input device transmits a data packet, it may request an acknowledgement from the transceiver before transmitting the next data packet. This may cause a delay in transmission of the information. Within this disclosure a data construct and associated methods therefore are disclosed that enables a user or a system to speed up communication between the peripheral device and the transceiver, and save bandwidth over the air.

Figure 2:
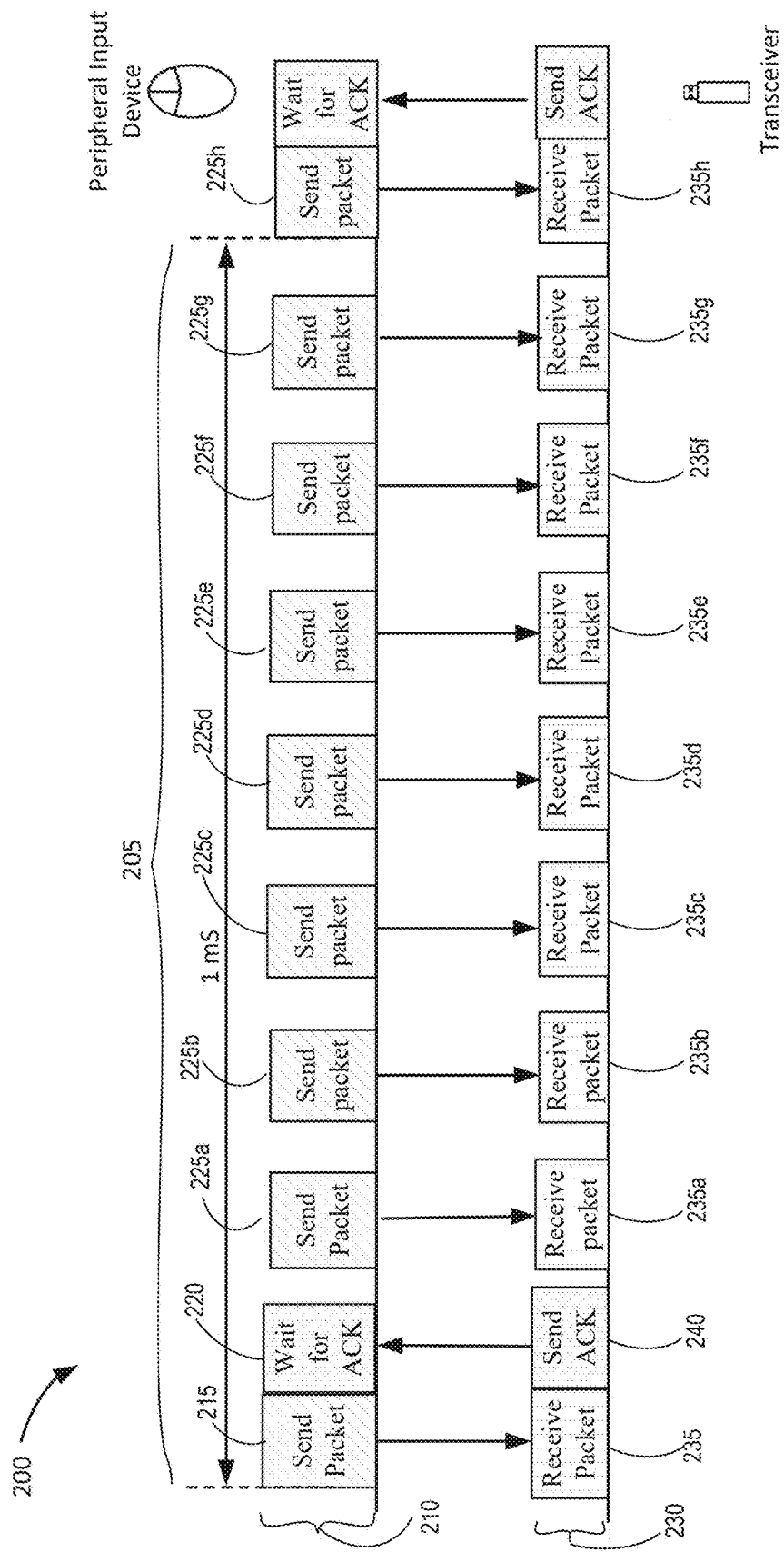
FIG. 2 illustrates a simplified sequence diagram depicting transmit/receive operations between host transceiver and a wireless peripheral device employing a communication protocol using acknowledge request/no acknowledge request, according to certain embodiments.

More specifically, in some embodiments the peripheral device may transmit data packets, depending on the input data type, without waiting to receive an acknowledgment from the transceiver. As illustrated in FIG. 2, an ACK 240 is sent for a first packet, but not the next 7 packets. Embodiments of the disclosure can remove the delay associated with waiting for an acknowledgment from the communication protocol, i.e. data packets can be transmitted from peripheral devices to the transceiver without waiting for an acknowledgment. Key presses without a release, and key releases after the key press was already acknowledged can be accumulated up to a limit without requesting an acknowledgement. In this way, waiting time periods for receipt of acknowledgement can be eliminated. This can save time for the air, speed up data transfer rates and can also have the added benefit of extending battery lifetime.

In embodiments, the no-acknowledgement packets include all the previous key presses since the last acknowledgment (if key press information is missing for a particular key, that indicates a key release in one embodiment). Thus, when a packet is missed, the transceiver can obtain the missing data in the next received packet.

In another embodiment, the packet size is variable. Packets for displacement data between the HID and the transceiver dongle contain only a packet type field and a small displacement field. The button fields and other fields are eliminated. Key data includes only fields for the key presses and releases since the last acknowledgement. This reduces the battery power required for transmissions in gaming and reduces the odds of a collision with another wireless transmission on the same channel. In embodiments, this can be combined with selective use of an acknowledgement.

Wireless Input Device and Host System

FIG. 1 shows a system 100 including host computing device 110 that can be coupled to a plurality of peripheral computer devices 130-150 via a wireless transceiver 120, according to certain embodiments. Host computer 110 may include any suitable computing device, such as a desktop computer, laptop computer, tablet computer, wearable computing device (e.g., head-mounted display, smart watch, etc.), entertainment/infotainment system, vehicle computing systems, or other suitable computing device. Although one host computing device is shown, one of skill in the art will appreciate that multiple computing devices may be used in the embodiments that follow. For example, each peripheral device 130, 140, 150 may be coupled to multiple host computing devices (e.g., but one at a time). Transceiver 120 can be coupled to host computer via a wired or hardwired connection.

In one embodiment transceiver 120 may be a USB transceiver (also referred to as a "dongle" herein) that is socketed in and coupled to host computer 110. In some embodiments transceiver 120 may be wirelessly coupled to host computer 110 using a Bluetooth®, BLE® or other wireless protocol. In some embodiments each peripheral device 130, 140, 150 may be required to go through an initial "pairing" process with transceiver 120 where they exchange data that can include sharing their addresses, names, and profiles which can be stored in memory.

The devices can also share a common secret key, which allows them to "connect" whenever they're within communications range in the future. When a peripheral device is connected to the transceiver, bidirectional communications between the devices can proceed using a data construct as described in more detail below.

In some embodiments, transceiver 120 and peripheral devices 130, 140, 150 communicate with each other via a piconet 135, 145, 155, which can also be referred do as a wireless communications path. In FIG. 1 piconet 135, 145, 155 is illustrated as wireless communication path 135 between transceiver 120 and first peripheral device 130, wireless communication path 145 between transceiver 120 and second peripheral device 140 and wireless communication path 155 between transceiver 120 and third peripheral device 150. The piconet can be a packet-based protocol as described in more detail below. A piconet can include a master device (transceiver 120) and one or more servant devices (peripheral devices 130, 140, 150). The master device coordinates communication throughout the piconet. The master device can send data to any of its servant devices and request data from them as well. Servant devices are allowed to transmit to and receive from their master.

Peripheral devices 130, 140, 150 can be any suitable computer peripheral device, however the examples shown here are typically found in conventional gaming systems. For instance, peripheral device 130 may be a computer mouse, peripheral device 140 can be a keyboard, and peripheral device 150 can be an audio headset with or without a microphone. Alternately, a gamepad, steering wheel, trackball, digital pen, etc. could be used as the peripheral device. Each peripheral device 130, 140, 150 can be wirelessly coupled to host computer 110 using a communications protocol that manages the report rate of the peripheral devices as described in more detail below. One of ordinary skill in the art with the benefit of this disclosure would appreciate the many modifications, variations, and alternative embodiments thereof. An input device may be a computer peripheral device, and may be referred to as either herein, as well as a "peripheral input device," "peripheral," or the like. The majority of the embodiments described herein generally refer to computer peripheral devices 130-150, however it should be understood that a computer peripheral device can be any suitable input/output (I/O) device (e.g., user interface device, control device, input unit, or the like) that may be adapted to utilize the novel embodiments described and contemplated herein.

Displacement Data without an Acknowledgement

FIG. 2 illustrates a simplified sequence diagram 200 depicting transmit/receive operations between transceiver 120 and a wireless peripheral device that can employ a communications protocol 205 using an acknowledge (ACK) request/no ACK request method, according to certain embodiments. The wireless peripheral device may be any of the above described peripheral devices 130-150 or any other Human Input Device (HID). In communication cycle 205, after an initial acknowledgement is sent (240) and received (220), multiple packets are sent without acknowledgements. As shown in FIG. 2, the time for communication cycle 205 for transceiver 120 and the peripheral device is set to 1 millisecond, so that an acknowledgement is sent at least every 1 ms. However other times for the communication cycle can be used, for example, somewhere between 0.75 and 1.25 milliseconds, between 0.5 and 2 milliseconds, between 0.25 and 5 milliseconds or between 0.0001 and 5 seconds or up to few seconds depending on the performances expected from the products. As described above, FIG. 2 is a simplified sequence diagram and one of skill in the art will appreciate that in other embodiments transmit and receive operations can be added to or removed from sequence diagram 200, without departing from the invention.

Within communication cycle 205, the peripheral device can employ a peripheral device packet pattern 210. The peripheral device packet pattern 210 may include a first transmit period 215 that can include an acknowledgement (ACK) request followed by a receive period 220 for waiting and receiving the ACK from the transceiver 120. The first transmit period 215 can be followed by 7 transmit periods 225a to 225g, where no ACK request is transmitted to the transceiver 120, until during the 9th transmit period 225h, when an acknowledge is requested. In this way, waiting time periods for receipt of ACK from the transceiver can be eliminated, thereby enabling communication with the transceiver at higher rate and saving battery lifetime.

Within communication cycle 205, transceiver 120 can employ a transceiver packet pattern 230. The transceiver packet pattern 230 may include a first receive packet period 235 that can include receipt of an ACK request, followed by a transmit period 240 for transmitting the ACK by the transceiver 120. The first receive period 235 can be followed by 7 receive periods 235a to 235g, where no ACK request is received by the transceiver 120, until during the $9^{th}$ receive period 235h, when an ACK request is received by the transceiver 120. The transceiver 120 can then proceed to transmit an ACK to the peripheral device. In some embodiments, transceiver 120 may have addressing, control and overhead functions in addition to transmit and receive windows, 235, 235a to 235h, and 240, respectively, that are used to communicate user data, as would be appreciated by one of skill in the art.

In some embodiments the maximum time for communication cycle 205 (i.e., report rate) can be predetermined. As an illustrative example such a configuration may be beneficial for a competitive gaming enthusiast who wants to set a maximum report cycle time of 125 microsecond, which correlates to a report rate of 8000 times per second for each peripheral device. Thus, without a request for an ACK, embodiments of the disclosure can enable a higher report rate for a peripheral device. As appreciated by one of skill in the art, each peripheral device can have different transmit and receive time requirements that can be taken into consideration when setting the minimum report rate of peripheral devices.

Sequence diagram 200 is an example only and one of skill in the art will appreciate that other data constructs could be used without departing from the scope of this disclosure. In this particular embodiment, sequence diagram 200 includes both transmit and receive operations to communicate user data between the transceiver and the peripheral devices.

In some embodiments, packets that contain only displacement information are transmitted without acknowledgment (ACK) request. In this way, wait time for an ACK receipt can be saved as well as bandwidth over the air. In order to remove any risk of loss of information, the following method is used where on the human interface device (HID) input side, only messages that contain relative data such has displacement (X/Y), vertical and/or horizontal roller data can be sent without ACK request. Other messages that contain, for example, key or roller clicks can also be sent without an ACK request, by accumulating events and having limits on the number of events and time before an ACK request. For displacement data, after a first data packet is sent with an ACK request, a counter for the current type of displacement data is initialized to 0. For example, one counter can be used for X, Y data and another counter for roller rotation data. Switching between types of displacement would cause a new ACK request to be sent, so the host knows the following data are for a different type of displacement. The counter is set to a value indicating the number of packets allowed to be sent within a communication cycle 205. That value is the rate at which packets are sent (report rate) multiplied by the communication cycle. The number of consecutive messages without ACK request may be determined by a delay between two messages with ACK (user experience (UX) parameters). A no ack mechanism has the inconvenience that the transmitter may not know if the message has been received, so in order to detect, for example that the current radio channel used is perturbated, an ACK may be used to detect if messages are received correctly. If the messages are not received correctly, embodiments of the disclosure can provide the information used to determine whether to use another radio channel. This decision period can be linked to the device and UX performances of the system. For example, a user may detect a lag when the UX parameters may include delay of few milliseconds, since the period may be slower than a keyboard where a key delay is less sensitive. A touchpad user, compared to a mouse could accept more delay as well. Another factor that can be considered is a delay for the communication from the host to the device. In the example of FIG. 2, the communication protocol may transmit seven data packets without an ACK and one data packet with an ACK every 125 μsec (maximum delay can be 1 msec). In some embodiments, a data packet with ACK may be sent every 0.05 ms to 1 ms, while in alternate embodiments it can be sent every 0.25 ms to 5 ms, while in yet other embodiments it can be sent every 0.25 ms to 10 ms. This is the latency for downstream message from the host to the HID input device. When there are no more activities detected from the sensor after a time period, an ACK request can be created and sent to the host transceiver. On the host receiver side, the host receiver may post any data packets received by removing the previous packets if the current data packet had no ACK request packet. This process is further described in more details as follows.

FIG. 3A illustrates a packet format, according to certain embodiments. Field 1 is a start of frame (SOF) indicator. Field 2 can identify the address. The address may be used to identify a piconet in case multiple users are in the same room. A device will exchange the address with the dongle during the pairing sequence. Field 3 can be a control information, with the fields identified in FIG. 3B, including whether an acknowledgement is required. This is followed by the payload (Field 4) with the displacement and button data. Field 5 contains a message integrity check used to verify the message has not been altered and correctly encrypted. Field 6 is the cyclic redundancy check (CRC) for the packet.

FIG. 3B shows a table 300 showing the details of a packet format for an HID input device, according to certain embodiments. More specifically, table 300 shows an example of a packet format that includes a bit for ACK/noACK in the control byte or control field. The ACK/noACK bit indicates whether an ACK is required or not.

Figure 4:
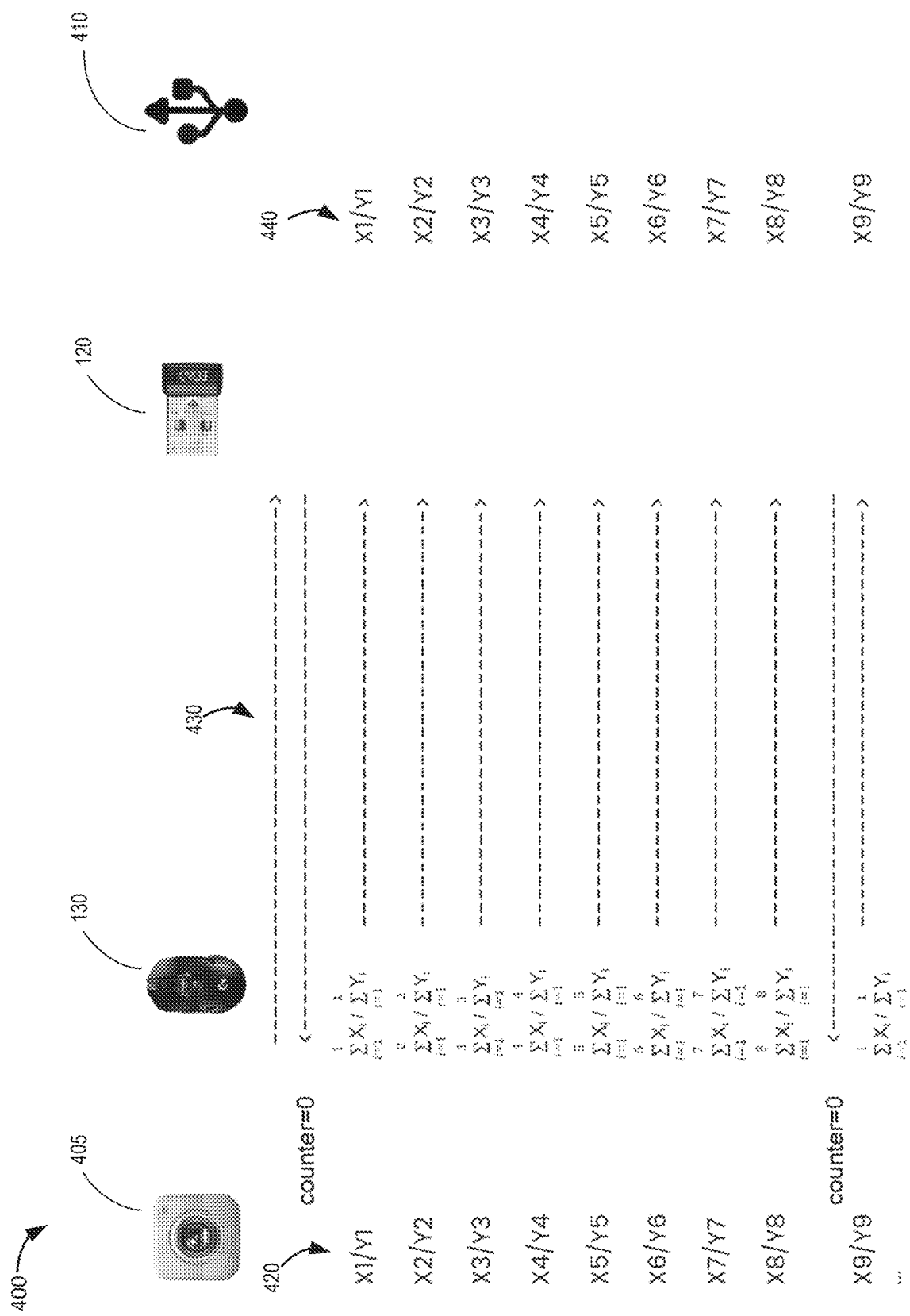
FIG. 4 illustrates a simplified sequence diagram depicting transmitting displacement data using an accumulation method, according to certain embodiments.

FIG. 4 illustrates a simplified sequence diagram 400 depicting transmitting displacement data using a displacement accumulation method, according to certain embodiments. In the illustrated embodiment, the wireless peripheral device 130 may be a computer mouse. The computer mouse may include a sensor 405 that is arranged to detect displacement data (X/Y information). The computer mouse wirelessly transmits data to a transceiver 120 which then sends appropriate parts of the data to the host via a USB connection 410. Column 420 shows the X/Y displacement data detected by sensor 405 since the last packet. Column 430 shows the displacement data wirelessly transmitted by the peripheral device (e.g., computer mouse) 130 to the transceiver 120 in response. The computer mouse is arranged to accumulate the displacement data, i.e., any data packet may include the displacement data for all the previous data packets. For example, the second data packet can include first displacement data and second displacement data, and the third data packet can include the first displacement data, second displacement data and third displacement data, up until the eighth data packet includes all the displacement data for the previous movements during the communications cycle. After packet 8, a new communications cycle begins, so the counter is reset to zero and the $9^{th}$ packet starts over without the previously accumulated displacement data. The transceiver 120 receives the accumulated displacement data. The data sent by the transceiver to the USB port 410 is shown in column 440. The transceiver processor determines what parts of the data have already been received in each packet, strips off the duplicate data, and sends only the new displacement data to the USB connection 410. Therefore, the computer mouse accumulates that displacement data while the transceiver 120 does the opposite, such that the USB 410 transmit the proper displacement date to the host.

The above-described method can be advantageous over a current approach of sending each data packet requesting an ACK and waiting for the ACK to be received. In current approaches, if the computer mouse is waiting for an ACK and does not receive the ACK, then the computer mouse would re-transmit all the previous displacement data. The disclosed accumulation method can solve this issue, i.e., when the last packet that includes all the previous displacement data is received by the host transceiver, the host can catch up and be at the right location (X/Y location) even if some of the previous packets were not properly received by the transceiver due to interferences.

Figure 5:
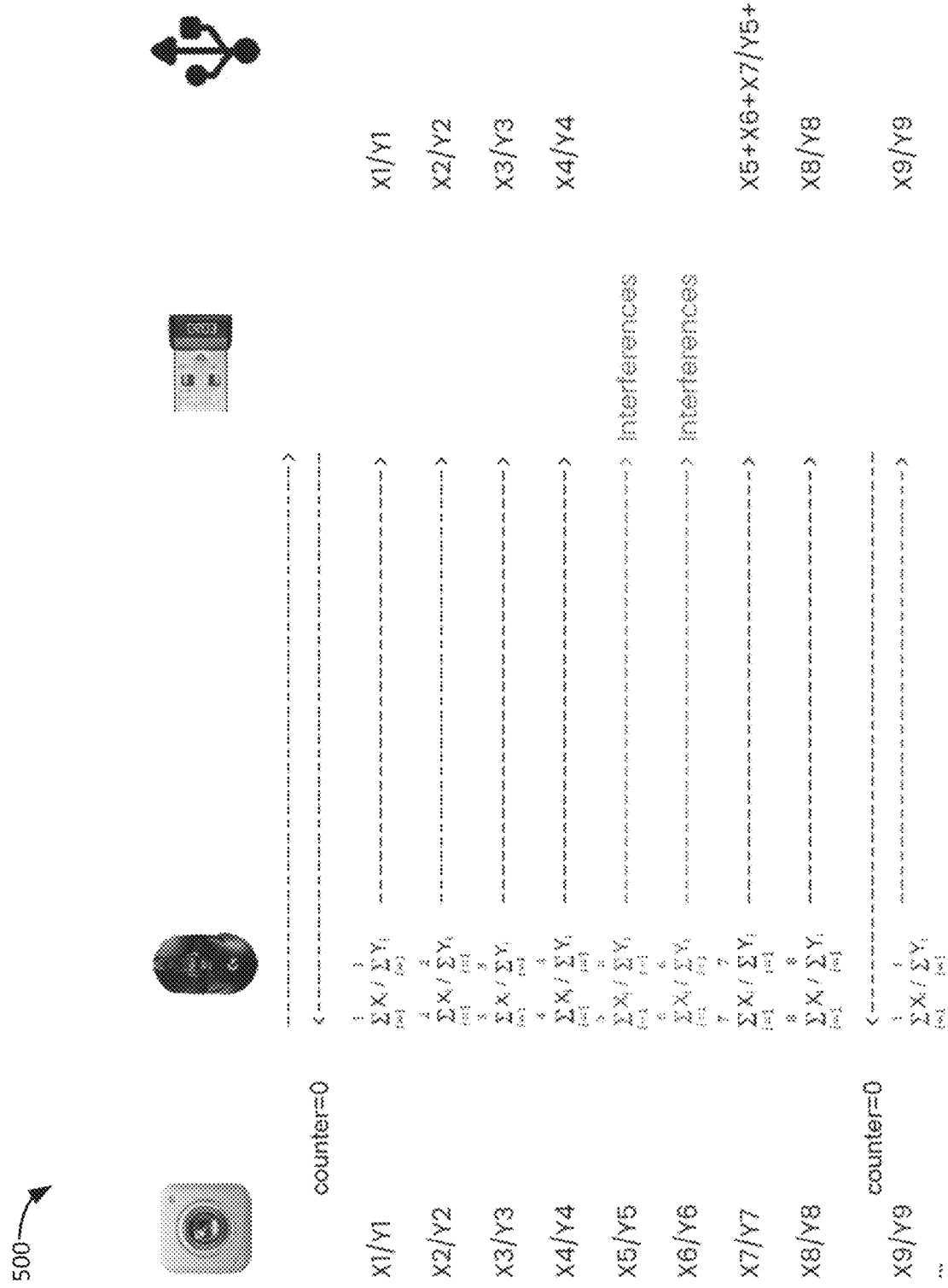
FIG. 5 illustrates a simplified sequence diagram depicting transmitting displacement data when a message is not received, according to certain embodiments.

FIG. 5 illustrates a simplified sequence diagram 500 depicting transmitting displacement data when a message is not received, according to certain embodiments. FIG. 5 illustrates a situation where interferences may disrupt a transmission of data midstream. In the illustrated embodiment, similar to FIG. 4, the wireless peripheral device 130 transmits the displacement data to the transceiver 120, however at packets 5 and 6 interferences may disrupt the receipt of data by the transceiver. The disclosed accumulation method can resolve this issue since the data is accumulated, i.e., packet 7, which is successfully received by the transceiver 120, includes all the data for the previous packets including the lost packets 5 and 6. Therefore, the transceiver 120 realizes that X4, Y4 was the last displacement data send to the USB connector and only strips off X1/Y1-X4/Y4, sending the data for packets 5 and 6 to the USB connector 410 along with X7/Y7. Subsequently, packet 8 is received by the transceiver without any disruptions, where the transceiver may remove all the data for the previous packets and only transmit packet 8 to the USB. After the transmission of packet 9, a new ACK is requested and must be received by the computer mouse. In this way, the computer mouse ensures that all the previously transmitted 8 packets are received. Therefore, the disclosed communication protocol ensures that interferences do not affect the data integrity. Further, even if there is interferences not only on packets 5 and 6, but also packets 7 and 8, the lack of a response to an ACK request on the packet 9 will indicate to the computer mouse that the previous transmission was not successful, therefore the computer mouse will retransmit the previous packets or may change channel and retransmit the previous packets.

Figure 6:
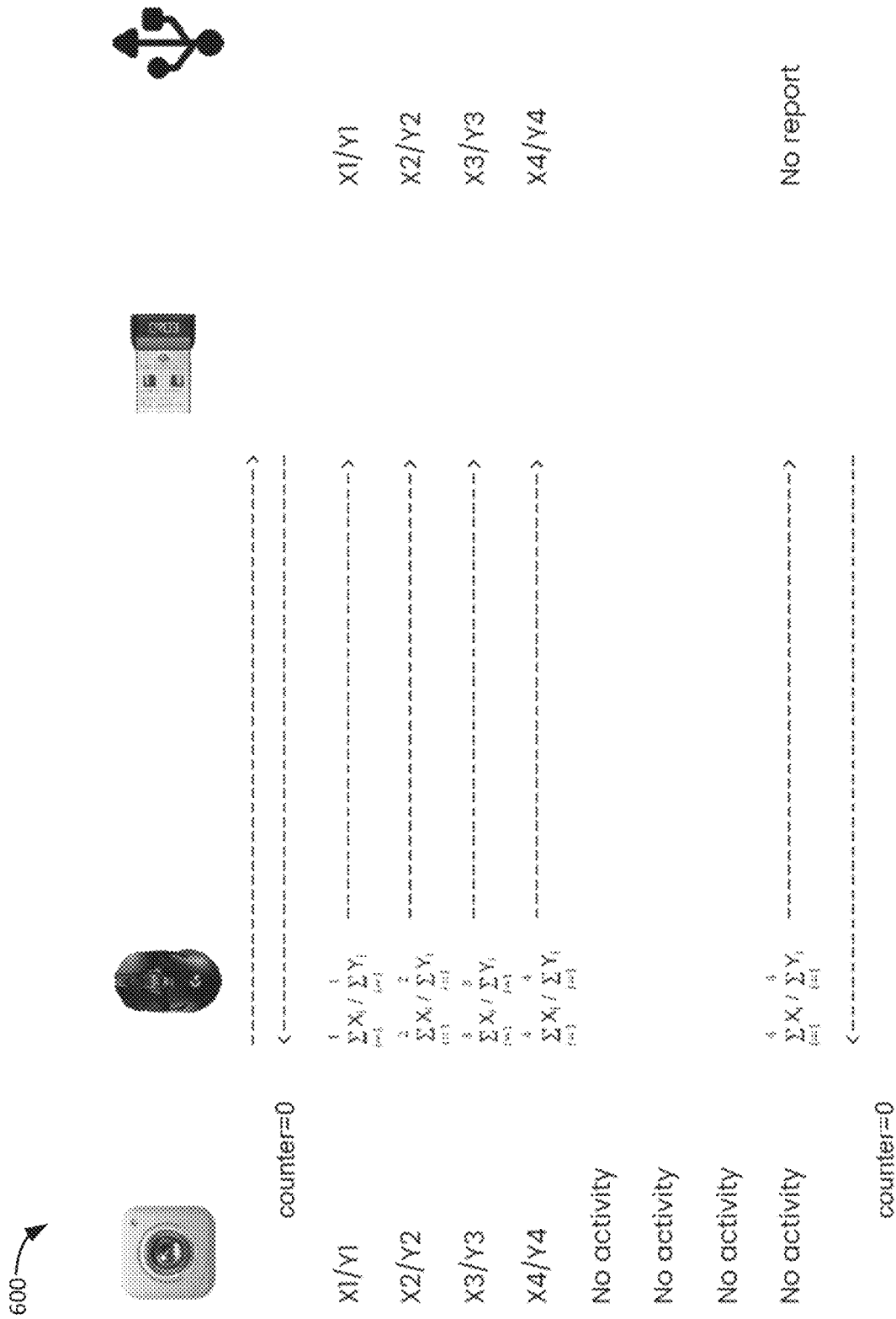
FIG. 6 illustrates a simplified sequence diagram depicting transmitting displacement data for end of user activity, according to certain embodiments.

FIG. 6 illustrates a simplified sequence diagram 600 depicting transmitting displacement data for end of user activity, according to certain embodiments. In the illustrated embodiment, similar to FIG. 4, the wireless peripheral device 130 transmits the displacement data to the transceiver 120, however after packets 4, the computer mouse may stop any movement, therefor no activity is detected by the sensor 405. In this case, there is no transmission of data at packets 5, 6 and 7. At packet 8, all the previous packets that include packets 1, 2, 3 and 4 are transmitted. However, since the transceiver had already received packets 1, 2, 3 and 4, no report is transmitted to the USB.

Key Data without an Acknowledgement

Data loss for some displacement data is not critical if the current displacement position is provided. The intermediate displacement is not critical. Unlike displacement data, key press data is all critical. The loss of any key press can lead to an error. Keys have two key events—the key press, and the key release. In some applications, such as gaming, it is common to hold a key down for an extended period of time before releasing it. This is typically used for actions that require sustained input, like moving a character in a direction, aiming a weapon, or performing a continuous action in a game. With a mouse, a key may be held for a drag operation, for example.

FIGS. 7A-7B illustrates a method for transmitting key data without an acknowledgement for every key press, and without losing data, according to embodiments. In the embodiment shown, key data is sent every 125 uS period, for an 8 kHz rate, but other rates can be used. In the example of FIGS. 7A-7B, a separate key is pressed each period, until 10 keys have been pressed, and not released. This is a highly unlikely scenario, but shows the maximum number of key presses in one embodiment.

In a first period 700, the A key is transmitted, having been pressed before or at the beginning of period 700. Period 700 picks up key presses after the beginning of the last transmission and before the current period transmission. In period 702, the B key has also been pressed at this point, so it is transmitted, along with the A key, indicating the A key is still pressed. By repeating the transmission of the A key, redundancy is provided in case the A key transmission during period 700 was not received due to interference or other issues. Subsequently, in period 704, the C key has been pressed, and A, B and C are all transmitted, providing further redundancy. This continues up to the limit of 10 key presses, as illustrated in table 1 below:

TABLE 1

| Period | Keys transmitted |
| --- | --- |
| 700 | A |
| 702 | AB |
| 704 | ABC |
| 706 | ABCD |

TABLE 1-continued

| Period | Keys transmitted |
|---|---|
| 708 | ABCDE |
| 710 | ABCDEF |
| 712 | ABCDEFG |
| 714 | ABCDEFGH |
| 716 | ABCDEFGHI |
| 718 | ABCDEFGHI |

When no other keys are pressed, the system waits for a period of time (720) of up to 1 mS in one embodiment, then repeats the last message with all the keys in period 722, with a request for an acknowledgement. An acknowledgement (ACK) is received in period 724. In one embodiment, the number of keys pressed can trigger an ACK request. For example, a threshold of 10 keys can be sent, in which case, after the $10^{th}$ key press (key J), all 10 keys will be immediately sent in a packet in period 718 with a request for an acknowledgement, and then a new sequence will start for new key presses or releases. In one embodiment, the threshold is a number of both key presses and releases. In an alternate embodiment, the threshold could be just the number of key presses, or just the number of key releases. Normally, only a few keys will be pressed before the 1 mS period ends. In other cases, one of the keys will be released before another key is pressed. The sequence will terminate upon a press and release of the same key in the same sequence, with a packet requesting an acknowledgement of the key press/release and any pending key presses. Although an ACK every 1 mS is shown as an example, other times for the communication cycle can be used. For example, some systems could use somewhere between 0.75 and 1.25 milliseconds, between 0.5 and 2 milliseconds, or between 0.25 and 5 milliseconds depending on the performances expected from the products. Alternately, the maximum delay can be measured in periods, such as 8 periods before an ACK request, or a delay between 2-16 periods or between 4-12 periods.

Figure 8A:
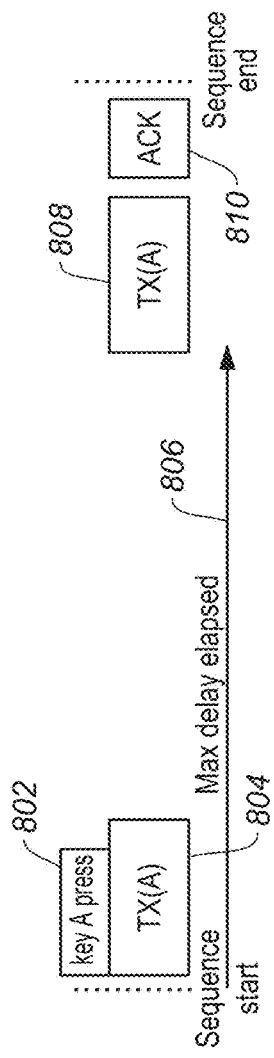
FIGS. 8A-8E illustrate how different sequences of key presses and releases are handled according to embodiments.

FIGS. 8A-8E illustrate how different sequences of key presses and releases are handled according to embodiments. In FIG. 8A, key A is pressed (802), and a transmission packet 804 is sent with the key A press information, without requesting an ACK. There is no other key press or release of key A during the timeout delay period 806. At the end of the delay (e.g., within 1 mS or 8 periods), the key A press packet is sent again, but this time with an acknowledgement request. This is followed by an ACK packet 810 being received. After that, the sequence starts again upon a next key press or key A release.

In one embodiment, the maximum delay is measured from the start of the sequence, just before packet 804 is sent, as shown in FIG. 8A. Alternatively, the maximum delay can be measured from right after the packet is sent. Other variations are also possible, such as starting the maximum delay timer at some point during the sending of packet 804, or some fixed time afterward. In another embodiment, the maximum delay is measured from the last packet sent or last key event in a sequence. The key event can be a key press or key release, or other key movement or activation. A timer is started after the first packet 804 or key event, assuming it is the last key event. If another key event or packet happens before the sequence is terminated, the timer is reset, since there is now a new event that is considered the last. The process repeats itself until it reaches what is indeed the last event.

Figure 8B:
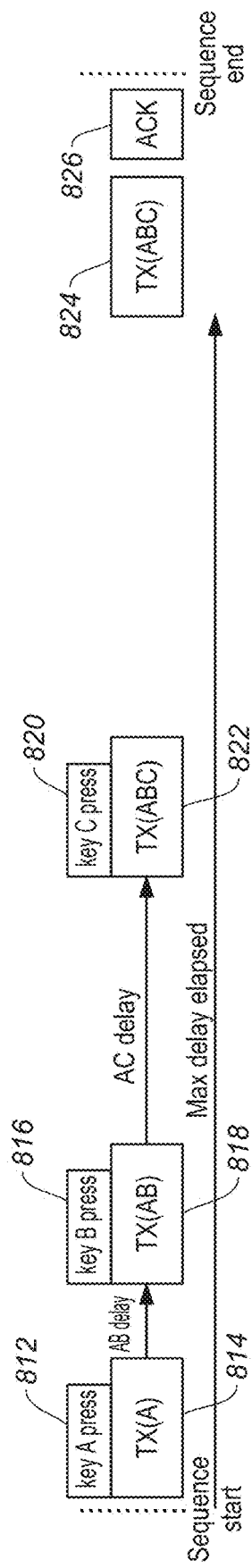

FIG. 8B illustrates an example where key A and B are pressed in quick succession, then key C is pressed after a delay. After key A is pressed (812), a no-acknowledgement packet 814 is transmitted with the key A press information. After a short delay, which may be the next period or two, key B is pressed (816). Packet 818 is then sent, with both the A and B key press information, and again no acknowledgement request. After that, there is a longer delay with no transmissions until key C is pressed (820), which triggers the transmission of no-acknowledgement packet 822 with key press information for keys A, B and C. The sequence period then times out with no further key presses or packets. The sequence timeout triggers the retransmission of key press information for A, B and C in a packet 824, along with an acknowledgement request. An ACK packet 826 is then sent by the host and received, confirming reception. As in other protocols, if an ACK is not received, the packet 824 with the ACK request is resent until an ACK is received.

Figure 8C:
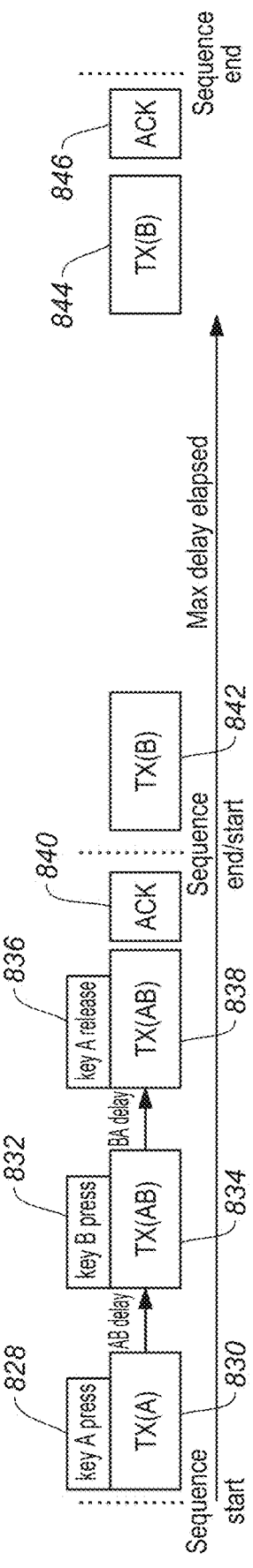

FIG. 8C illustrates an example where key A and B are pressed in quick succession, then key A is released. Key A press 828 is followed by a no-acknowledgement transmission packet 830 with the key A press information. Subsequently, key B press 832 is followed by a no-acknowledgement transmission packet 834 with the key B information along with the key A information again. Both of these are without requesting an acknowledgement. This is followed by a key A release 836, which triggers a packet 838 which retransmits the key A and B press information. Packet 838 includes a request for an acknowledgement. An acknowledgement 840 is then received. Thus, in this example, the key release, after the same key press in the sequence, terminates the waiting period, and an acknowledgement is immediately requested.

Next, a new sequence is started. Since key B has not been released, it is retransmitted in a packet 842, even though the press was acknowledged with ACK 840. This packet does not repeat the key A press information, which indicates to the host that key A has been released. The packet 842 is sent right after the ACK 840 to immediately provide the key A release information in this manner. This method also allows the system to keep track of the fact that key B is still pressed. When no other key action occurs during the timeout period, packet 844 resends the key B press information, indicating it is still being pressed, and requests an acknowledgement. An acknowledgement 846 is then received, which acknowledges both that key B is still pressed, and no key A press was received, indicating key A has been released. The sequence will repeat until key B is released, or another key is pressed. The key A release triggers a request for an acknowledgement because the key A press was earlier in the same sequence, after the last acknowledgement (from an earlier sequence). If the key A had been pressed in the earlier sequence, and thus already acknowledged, the key A release would not generate an immediate acknowledgement request as shown in FIG. 8C. Rather, the system could wait for the sequence to time-out, and send the acknowledgement request at the end of the time delay. In yet another alternate embodiment, the release could always trigger an immediate acknowledgement request, whether the key press was in the same sequence or not.

In yet another alternate embodiment, packet 842 can indicate an immediate ACK, rather than wait for the end of the sequence, to determine that the key A release information has been received, and not lost due to interference. In another alternate embodiment, since the host already has acknowledged receipt of the key B press information with ACK packet 840 with ACK 840 and then packet 842, and no transmission of key B is sent in the sequences following ACK 846. Thus, there is no further transmission until either another key is pressed, or key B is released. The methods described herein avoid jitter, since there is not packet that will slow down the sequence (e.g., extend a period waiting for an ACK).

Figure 8D:
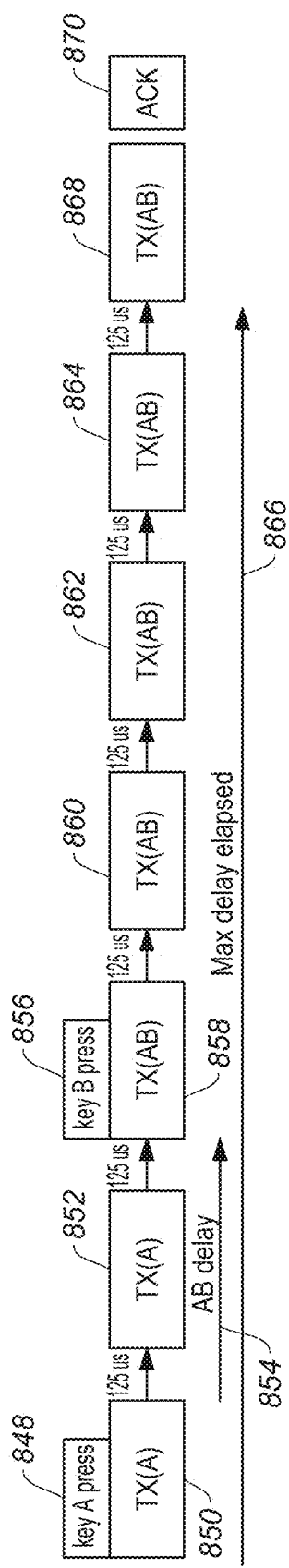

FIG. 8D shows an alternate embodiment. In the preceding examples, when there are no more key events, no more reports are sent. The variation of the embodiment of FIG. 8D consists of, while waiting for the predefined delay, retransmitting the last report that was sent previously. This does not add extra information, but it will help to increase performance in noisy environments by providing redundancy in case one or more packets are lost. The trade-off is the consumption of more bandwidth. In one embodiment, the system switches to this mode when a noisy channel is detected. The receiver can detect the noise and send a notice to the transmitter to switch to this mode until the noise passes. When the noise persists, the transmission channel can be changed.

The example of FIG. 8D shows a key A press 848 followed by a transmission packet 850 with the key A press information, but no request for an acknowledgement. With no key press in the next period, instead of waiting for a delay 854 until the key B press, the key A press information is sent again in a no-acknowledgement packet 852. Subsequently, there is a key B press 856, followed by a no-acknowledgement packet 858 with the key B press information, along with a repeat of the key A press information. Subsequent periods have no further key press or release, so the system takes advantage of this to repeatedly send redundant packets with the key A and B press information in no-acknowledgement packets 860, 862, and 864. At the end of the timeout of the maximum delay 866 (e.g., 1 mS from the Key A press), another packet 868 is sent with key A and B press information, but this time with an acknowledgement request. An ACK packet 870 is then received, and the sequence starts over again.

There are a variety of possible variations on the method of FIG. 8D. In one embodiment, the number of redundant packets could be limited. For example, only 3 redundant packets could be sent. Alternately, the redundant packets could be sent every other sequence, thus not using bandwidth for sequences in-between the packets. The next sequence after the ACK could repeat the key press information or not, until a key release is detected.

Figure 8E:
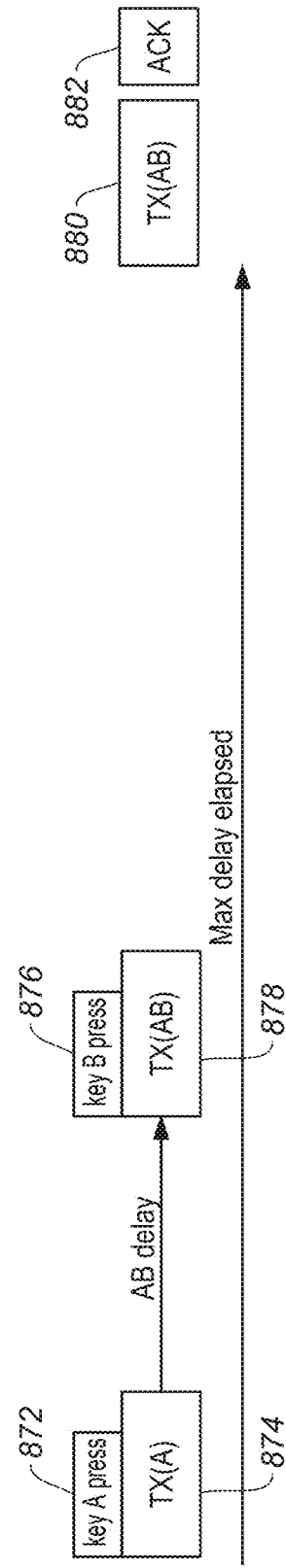

FIG. 8E illustrates an example of an alternative to the redundant packet of FIG. 8D, where no redundant packet is sent. In this example, after key A is pressed (872), a no-acknowledgement packet 874 is transmitted with the key A press information. After a short delay, which may be the next period or two, key B is pressed (876). Packet 878 is then sent, with both the A and B key press information, and again no acknowledgement request. After that, there is a longer delay until the sequence timeout triggers the retransmission of key press information for A and B in a packet 880, along with an acknowledgement request. An ACK packet 882 is then sent by the host and received, confirming reception. As in other protocols, if an ACK is not received, the packet 880 with the ACK request is resent until an ACK is received.

Figure 9:
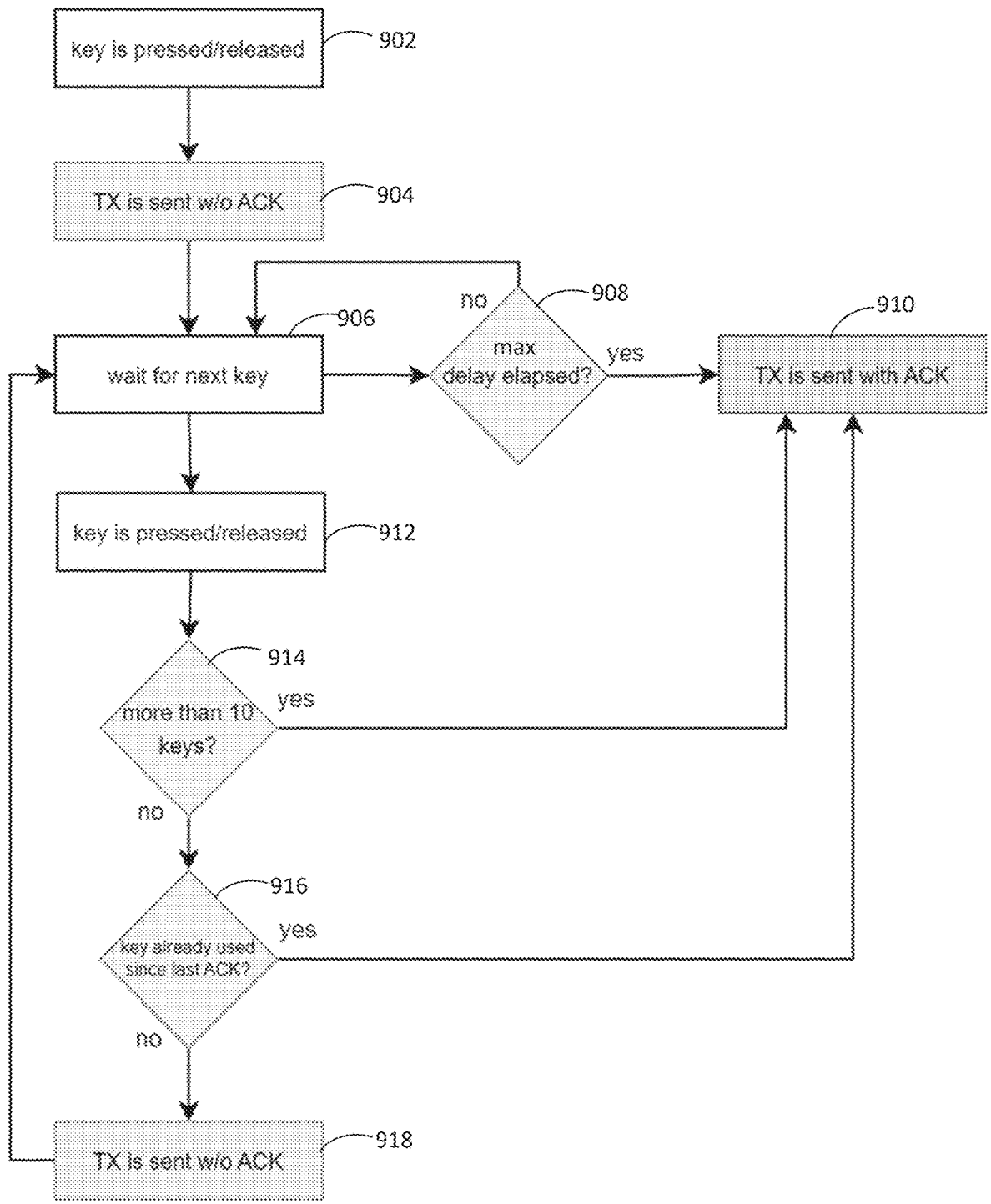
FIG. 9 is a flowchart illustrating a method for a sequence of periods of transmitting key data without an acknowledgement for every key press/release, according to embodiments.

FIG. 9 is a flowchart illustrating a method for a sequence of periods of transmitting key data without an acknowledgement for every key press/release, according to embodiments. In step 902, a key is pressed or released as the first event in a sequence. In step 904, a packet is transmitted to the host without a request for an acknowledgement. Step 906 is waiting for a next key event. Test 908 determines when a maximum delay has elapsed without a further key event. If yes, a transmission is sent with all the key presses and releases in the sequence, requesting an acknowledgement (step 910). Otherwise, the system waits for the next key press 912. When the key press/release count is more than 10 (step 914), a transmission is sent with all the key presses and releases in the sequence, requesting an acknowledgement (step 910). When 10 events have not been reached, the other test (916) is whether the same key has already been used since the last acknowledgement. A key is used when there has been both a press and release, or release and press, in the same sequence. When the answer is yes, a transmission is sent with all the key presses and releases in the sequence, requesting an acknowledgement (step 910). Otherwise, a transmission is sent without an acknowledgement request in step 918, and the process returns to waiting for a next key event in step 906.

Peripheral Device

Figure 10:
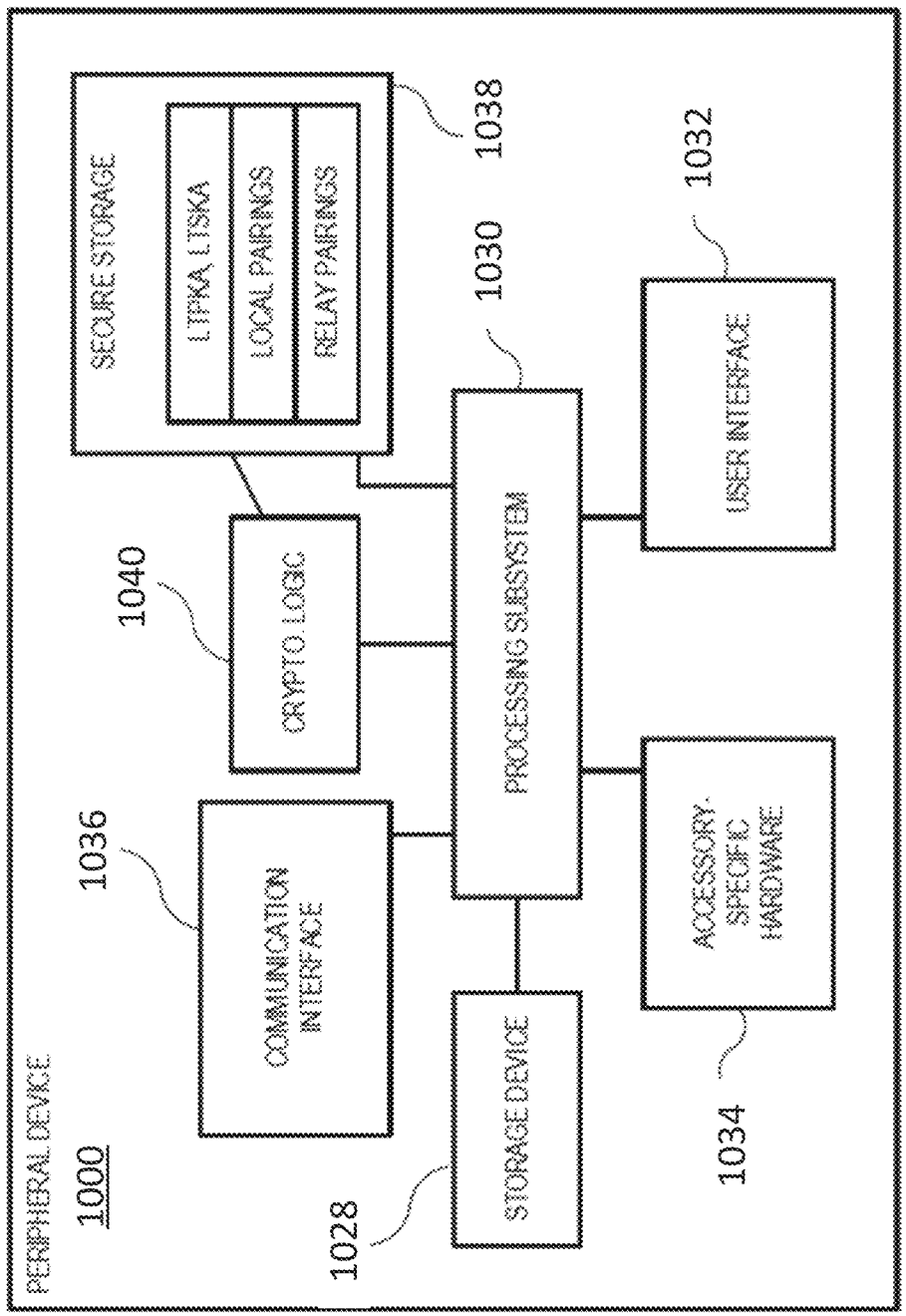
FIG. 10 shows a simplified block diagram of an example HID peripheral device, according to certain embodiments.

FIG. 10 shows a simplified block diagram of an example HID peripheral device 1000, according to certain embodiments. Peripheral device 1000 can implement any or all of the peripheral device functions, behaviors, and capabilities described herein, as well as other functions, behaviors, and capabilities not expressly described. Peripheral device 1000 can include storage device 1028, processing subsystem 1030, user interface 1032, peripheral device-specific hardware 1034, communication interface 1036, secure storage module 1038, and cryptographic logic module 1040. Peripheral device 1000 can also include other components (not explicitly shown) such as a battery, power media access devices, and other components operable to provide various enhanced capabilities.

Peripheral device 1000 is representative of a broad class of devices that can be used in conjunction with a host device and include key data, such as but not limited to mice, keyboards, trackballs, gamepads, steering wheels, remote controls, pointing devices, digital pens and the like. Various accessories may include components not explicitly shown in FIG. 10, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1028 can be implemented, e.g., using disk, flash memory, or any other non-transitory storage medium, or a combination of media, and can include volatile and/or non-volatile media. In some embodiments, storage device 1028 can store one or more programs (e.g., firmware) to be executed by processing subsystem 1030, including programs to implement various operations described above as being performed by a peripheral device, as well as operations related to particular peripheral device behaviors. Storage device 1028 can also store a peripheral device object or peripheral device definition record that can be furnished to host devices, e.g., during device discovery. Storage device 1028 can also store peripheral device state information and any other data that may be used during operation of peripheral device 1000. Storage device 1028 can also store program code executable to communicate with a transceiver 120, as shown in FIG. 1, e.g., as described above.

Processing subsystem 1030 can include, e.g., one or more single-core or multi-core microprocessors and/or microcontrollers executing program code to perform various functions associated with peripheral device 1000. For example, processing subsystem 1030 can implement various processes (or portions thereof) described above as being implemented by a peripheral device, e.g., by executing program code stored in storage device 1028. Processing subsystem 1030 can also execute other programs to control other functions of peripheral device 1000. In some instances programs executed by processing subsystem 1030 can interact with a host, e.g., by generating messages to be sent to the host and/or receiving messages from the host. In some instances, the messages can be sent and/or received using a transceiver 120, as shown in FIG. 1, as described above.

User interface 1032 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular peripheral device 1000, a user can operate input devices of user interface 1032 to invoke functionality of peripheral device 1000 and can view and/or hear output from peripheral device 1000 via output devices of user interface 1032. Some accessories may provide a minimal or no user interface. Where the peripheral device does not have a user interface, a user can still interact with the peripheral device using a host (e.g., host 1100).

Peripheral device-specific hardware 1034 can include any other components that may be present in peripheral device 1000 to enable its functionality. For example, in various embodiments peripheral device-specific hardware 1034 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of peripheral device functionality can be supported by providing appropriate peripheral device-specific hardware 1034 and that peripheral device-specific hardware can include mechanical as well as electrical or electronic components.

Communication interface 1036 can provide voice and/or data communication capability for peripheral device 1000. In some embodiments communication interface 1036 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1036 can provide wired network connectivity (e.g., Ethernet) in addition to or instead of a wireless interface. Communication interface 1036 can be implemented using a combination of hardware (e.g., driver circuits, antennas, modulators/demodulators, encoders/decoders, and other analog and/or digital signal processing circuits) and software components. In some embodiments, communication interface 1036 can support multiple communication channels concurrently or at different times, using the same transport or different transports. Thus, for example, peripheral device 1000 can communicate with a host via a local channel at some times and via a relay service at other times.

Secure storage module 1038 can be an integrated circuit or the like that can securely store cryptographic information for peripheral device 1000. Examples of information that can be stored within secure storage module 1038 include the peripheral device's long-term public and secret keys (LTPKA, LTSKA), a list of local pairings (e.g., a lookup table that maps a local host identifier to a host long-term public key (LTPKC) for hosts that have completed a local pair setup or pair add process, e.g., as described above, with peripheral device 1000), and a list of relay pairings (e.g., host Ras and associated access tokens for hosts that have established a relay pairing, e.g., as described above, with peripheral device 1000). In some embodiments, pairing information can be stored such that a local pairing is mapped to the corresponding relay pairing in instances where both a local pairing and a relay pairing with the host have been established. In some embodiments, secure storage module 1038 can be omitted; keys and lists of paired hosts can be stored in storage device 1028.

In some embodiments, cryptographic operations can be implemented in a cryptographic logic module 1040 that communicates with secure storage module 1038. Physically, cryptographic logic module 1040 can be implemented in the same integrated circuit with secure storage module 1038 or a different integrated circuit (e.g., a processor in processing subsystem 1030) as desired. Cryptographic logic module 1040 can include various logic circuits (fixed or programmable as desired) that implement or support cryptographic operations of peripheral device 1000, including any or all cryptographic operations described above. Secure storage module 1038 and/or cryptographic logic module 1040 can appear as a "black box" to the rest of peripheral device 1000. Thus, for instance, communication interface 1036 can receive a message in encrypted form that it cannot decrypt and can simply deliver the message to processing subsystem 1030. Processing subsystem 1030 may also be unable to decrypt the message, but it can recognize the message as encrypted and deliver it to cryptographic logic module 1040. Cryptographic logic module 1040 can decrypt the message (e.g., using information extracted from secure storage module 1038) and determine what information to return to processing subsystem 1030. As a result, certain information can be available only within secure storage module 1038 and cryptographic logic module 1040. If secure storage module 1038 and cryptographic logic module 1040 are implemented on a single integrated circuit that executes code only from an internal secure repository, this can make extraction of the information extremely difficult, which can provide a high degree of security. Other implementations are also possible.

Peripheral device 1000 can be any electronic apparatus that interacts with host 1100. In some embodiments, host 1100 can provide remote control over operations of peripheral device 1000 as described below. For example, host 1100 can provide a remote user interface for peripheral device 1000 that can include both input and output controls (e.g., a display screen to display current status information obtained from peripheral device 1000 and an input control such as a touchscreen overlay to allow changes to the status information). Host 1100 in various embodiments can control any function of peripheral device 1000 and can also receive data from peripheral device 1000, via a transceiver 120, as shown in FIG. 1.

Host

Figure 11:
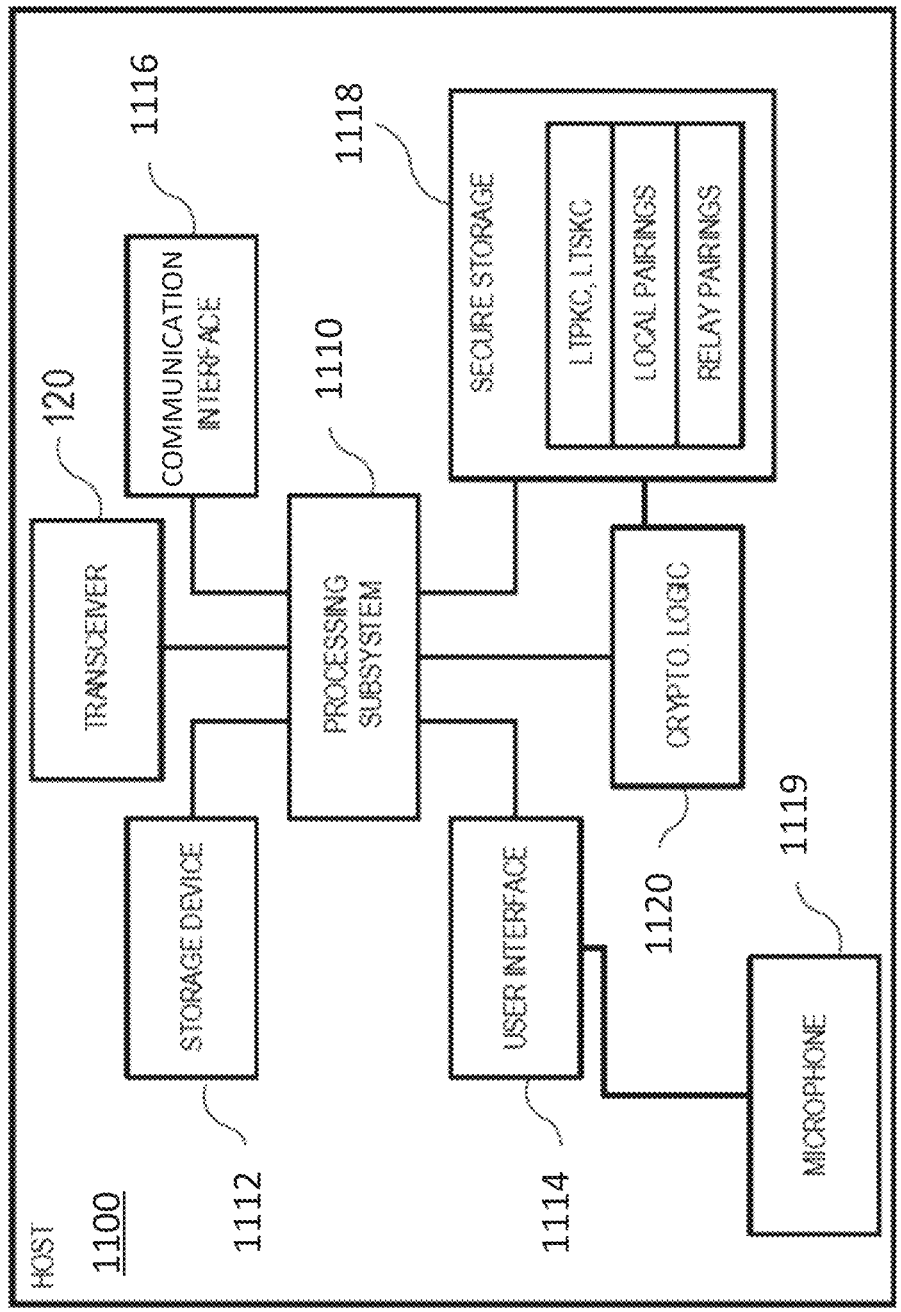
FIG. 11 shows a simplified block diagram of an example host, according to certain embodiments.

FIG. 11 shows a simplified block diagram of an example host 1100, according to certain embodiments. In some embodiments, host 1100 can implement any or all of the functions, behaviors, and capabilities described herein as being performed by a host, as well as other functions, behaviors, and capabilities not expressly described. Host 1100 can include processing subsystem 1110, storage device 1112, user interface 1114, communication interface 1116, secure storage module 1118, and cryptographic logic module 1120. Host 1100 can also include other components (not explicitly shown) such as a battery, power controllers, and other components operable to provide various enhanced capabilities. In various embodiments, host 1100 can be implemented in a desktop computer, laptop computer, tablet computer, smart phone, other mobile phone, wearable computing device, or other systems having any desired form factor. Further, as noted above, host 1100 can be implemented partly in a base station and partly in a mobile unit that communicates with the base station and provides a user interface.

Storage device 1112 can be implemented, e.g., using disk, flash memory, or any other non-transitory storage medium, or a combination of media, and can include volatile and/or non-volatile media. In some embodiments, storage device 1112 can store one or more application and/or operating system programs to be executed by processing subsystem 1110, including programs to implement various operations described above as being performed by a host. For example, storage device 1112 can store a uniform host application that can read a peripheral device description record and generate a graphical user interface for controlling the peripheral device based on information therein. Storage device 1112 can also store program code executable to communicate with a transceiver 120, as shown in FIG. 1, e.g., as described above. Although FIG. 10 illustrates transceiver 120 as a subsystem of host 1100 it is understood that transceiver 120 may be a dongle that is plugged into and electrically coupled with host 1100. Transceiver 120 may contain its own processor for processing received packets as described above, or can be controlled by host processing system 1110 which will perform those functions. In some embodiments, portions (or all) of the host functionality described herein can be implemented in operating system programs rather than applications. In some embodiments, storage device 1112 can also store apps designed for specific accessories or specific categories of accessories (e.g., an IP camera app to manage an IP camera peripheral device or a security app to interact with door lock accessories).

User interface 1114 can include input devices such as a touch pad, touch screen, scroll wheel, click wheel, dial, button, switch, keypad, microphone 1119, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1114 to invoke the functionality of host 1100 and can view and/or hear output from host 1100 via output devices of user interface 1114.

Processing subsystem 1110 can be implemented as one or more integrated circuits, e.g., one or more single-core or multi-core microprocessors or microcontrollers, examples of which are known in the art. In operation, processing system 1110 can control the operation of host 1100. In various embodiments, processing subsystem 1110 can execute a variety of programs in response to program code and can maintain multiple concurrently executing programs or processes. At any given time, some or all of the program code to be executed can be resident in processing subsystem 1110 and/or in storage media such as storage device 1112.

Through suitable programming, processing subsystem 1110 can provide various functionality for host 1100. For example, in some embodiments, processing subsystem 1110 can implement various processes (or portions thereof) described above as being implemented by a host. Processing subsystem 1110 can also execute other programs to control other functions of host 1100, including application programs that may be stored in storage device 1112. In some embodiments, these application programs may interact with a peripheral device, e.g., by generating messages to be sent to the peripheral device and/or receiving responses from the peripheral device. Such interactions can be facilitated by a peripheral device management daemon and/or other operating system processes, e.g., as described above, and can include communicating with the peripheral device via a transceiver 120, as shown in FIG. 1, as described above.

Communication interface 1116 can provide voice and/or data communication capability for host 1100. In some embodiments communication interface 1116 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1116 can provide wired network connectivity (e.g., Ethernet) in addition to or instead of a wireless interface. Communication interface 1116 can be implemented using a combination of hardware (e.g., driver circuits, antennas, modulators/demodulators, encoders/decoders, and other analog and/or digital signal processing circuits) and software components. In some embodiments, communication interface 1116 can support multiple communication channels concurrently or at different times, using the same transport or different transports. Thus, for example, host 1100 can communicate with accessories via a local channel at some times and via a relay service at other times.

Secure storage module 1118 can be an integrated circuit or the like that can securely store cryptographic information for host 1100. Examples of information that can be stored within secure storage module 1118 include the host's long-term public and secret keys (LTPKC, LTSKC), a list of local pairings (e.g., a lookup table that maps a local peripheral device identifier to a peripheral device long-term public key (LTPKA) for accessories that have completed a local pair setup or pair add process, e.g., as described above, with host 1100), and a list of relay pairings 1126 (e.g., peripheral device Ras and associated access tokens for accessories that have established a relay pairing, e.g., as described above, with host 1100). In some embodiments, pairing information can be stored such that a local pairing 1124 is mapped to the corresponding relay pairing 1126 in instances where both a local pairing and a relay pairing with the peripheral device have been established.

In some embodiments, cryptographic operations can be implemented in a cryptographic logic module 1120 that communicates with secure storage module 1118. Physically, cryptographic logic module 1120 can be implemented in the same integrated circuit with secure storage module 1118 or a different integrated circuit (e.g., a processor in processing subsystem 1110) as desired. Cryptographic logic module 1120 can include various logic circuits (fixed or programmable as desired) that implement or support cryptographic operations of host 1100, including any or all cryptographic operations described above. Secure storage module 1118 and/or cryptographic logic module 1120 can appear as a "black box" to the rest of host 1100. Thus, for instance, communication interface 1116 can receive a message in encrypted form that it cannot decrypt and can simply deliver the message to processing subsystem 1110. Processing subsystem 1110 may also be unable to decrypt the message, but it can recognize the message as encrypted and deliver it to cryptographic logic module 1120. Cryptographic logic module 1120 can decrypt the message (e.g., using information extracted from secure storage module 1118) and determine what information to return to processing subsystem 1110. As a result, certain information can be available only within secure storage module 1118 and cryptographic logic module 1120. If secure storage module 1118 and cryptographic logic module 1120 are implemented on a single integrated circuit that executes code only from an internal secure repository, this can make extraction of the information extremely difficult, which can provide a high degree of security. Other implementations are also possible.

Further, while a host is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Hosts and accessories described herein can be implemented in electronic devices that can be of generally conventional design. Such devices can be adapted to communicate using a uniform peripheral device protocol that supports command-and-control operations by which a host (a first electronic device) can control operation of a peripheral device (a second electronic device). In some instances, a device can combine features or aspects of a host and a peripheral device, e.g., in the case of a proxy as described above.

It will be appreciated that the system configurations and components described herein are illustrative and that variations and modifications are possible. It is to be understood that an implementation of host 1100 can perform all operations described above as being performed by a media access device and that an implementation of peripheral device 1000 can perform any or all operations described above as being performed by a peripheral device. A proxy, bridge, tunnel, or coordinator can combine components of host 1100 and peripheral device 1000, using the same hardware or different hardware as desired. The media access device and/or peripheral device may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular peripheral device can have some functionality that is not accessible or invocable via a particular media access device but is accessible via another host or by interacting directly with the peripheral device.

Further, while the media access device and peripheral device are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Reduced Size Packet for HID Displacement Data

Figure 12:
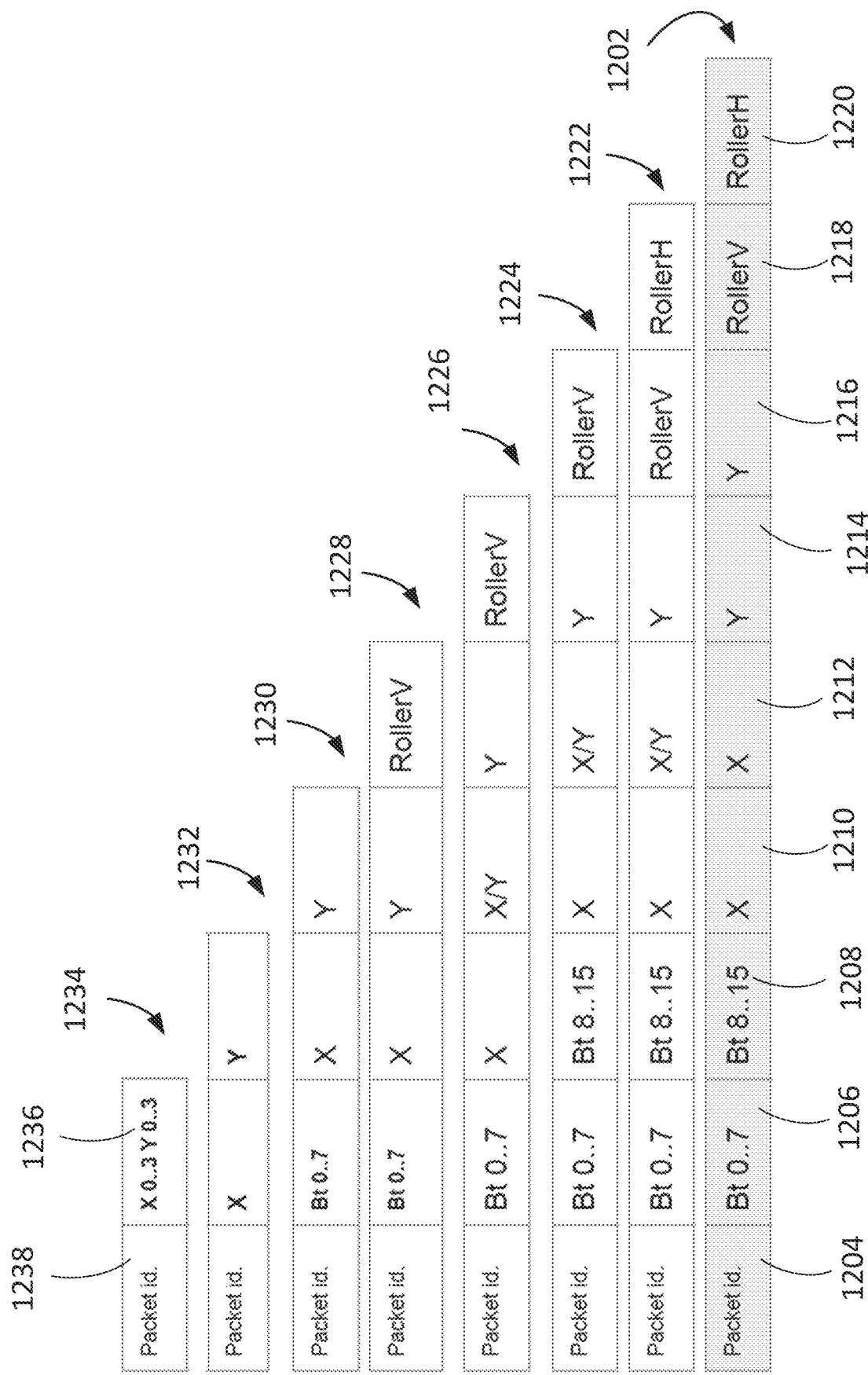
FIG. 12 is a diagram illustrating different packet configurations compared to a standard packet for communicating mouse events to a computer, according to embodiments.

FIG. 12 is a diagram illustrating different packet configurations compared to a standard packet for communicating mouse events to a computer, according to embodiments. Similar packets would be used for other input devices, but with different fields. For example, a keyboard would not have the same displacement information and a gamepad could have displacement information for a mini-joystick instead. FIG. 12 is thus just an illustrative example. Packet 1202 illustrates the payload of a standard packet for the chosen descriptor. Packet 1234 shows the actual packet sent when there is only displacement data in embodiments of the present invention.

Standard packet 1202 includes a packet type identifier 1204. Field 1206 is a byte (8 bits) for 8 buttons/keys, 0-7. A digital 1 indicates that button was activated, a digital 0 indicates no activation. Press and release distinguished because for a press, the field goes from 0 to 1, and for a release, the field goes from 1 to 0. Field 1208 similarly provides for a possible additional 8 buttons. Field 1210 provides 8 bits for X displacement. The digital value indicates the amount of X displacement. Field 1212 provides an additional 8 bits for X displacement, in case more than the 8 bits of field 1210 are needed. Fields 1414 and 1216 similarly provide 8 or 16 bits for Y displacement. Field 1218 provides 8 bits for roller movement in the vertical direction. Field 1220 provides 8 bits for roller movement in the horizontal direction.

Embodiments provide a reduced packet size for both key and displacement data. In various embodiments, the displacement data can be X, Y or Z displacement data, pitch, roll, or yaw rotation data, angular data, etc. The displacement can be from scrolling wheels and/or cursor buttons, trackballs, gamepads (D-pads or mini joysticks), steering wheels, remote controls, pointing devices, digital pens and the like. The key data can be from any switch activation, such as a keyboard key, a mouse button click, a mouse roller click, etc. Embodiments provide a variable length packet. Packet 1234 has only a byte 1238 identifying the packet type (as having just a one-byte displacement field) and byte 1236 with 4 bits for X displacement and 4 bits for Y displacement. When transceiver 120 receives packet 1234, it converts it back to the format of packet 1202. The 4 X bits of byte 1236 are mapped to the last 4 bits of byte 1212, with the first 4 bits being set to 0. The 4 Y bits of byte 1236 are mapped to the last 4 bits of byte 1216, with the first 4 bits of byte 1216 being set to zero. All the bits of X byte 1210 and Y byte 1214 are set to zero. All the bits of the rest of the bytes are also set to zero.

Packets 1222-1232 show various intermediate packet formats. In one embodiment, only packet types 1202 and 1234 are used. The unused fields of packet type 1202 are simply set to zero. Alternately, any number of intermediate combinations could be used, with examples 1222-1232 given. Packet 1222 combines the high-end bits of the X and Y displacement in a byte X/Y, with 4 bits for each. Thus, there are 8+4=12 bits for each of X and Y displacements. Packet 1224 has no horizontal roller movement, which is less common than vertical roller movement. Packet 1226 eliminates the second set of buttons. Packet 1228 eliminates the extra 4 bits for X/Y. Packet 1230 eliminates the vertical roller bits. Packet 1232 eliminates all buttons. These are just examples, and other combinations of fields are possible, depending on what events occur on the mouse. For other devices, such as a gamepad, steering wheel, etc., the roller fields are replaced with relevant fields for the input elements on the device. For example, a gamepad has a mini joystick instead of a roller, with x, y movement in the fields that are used for mouse displacement.

Method for Combined Embodiments

Figure 13:
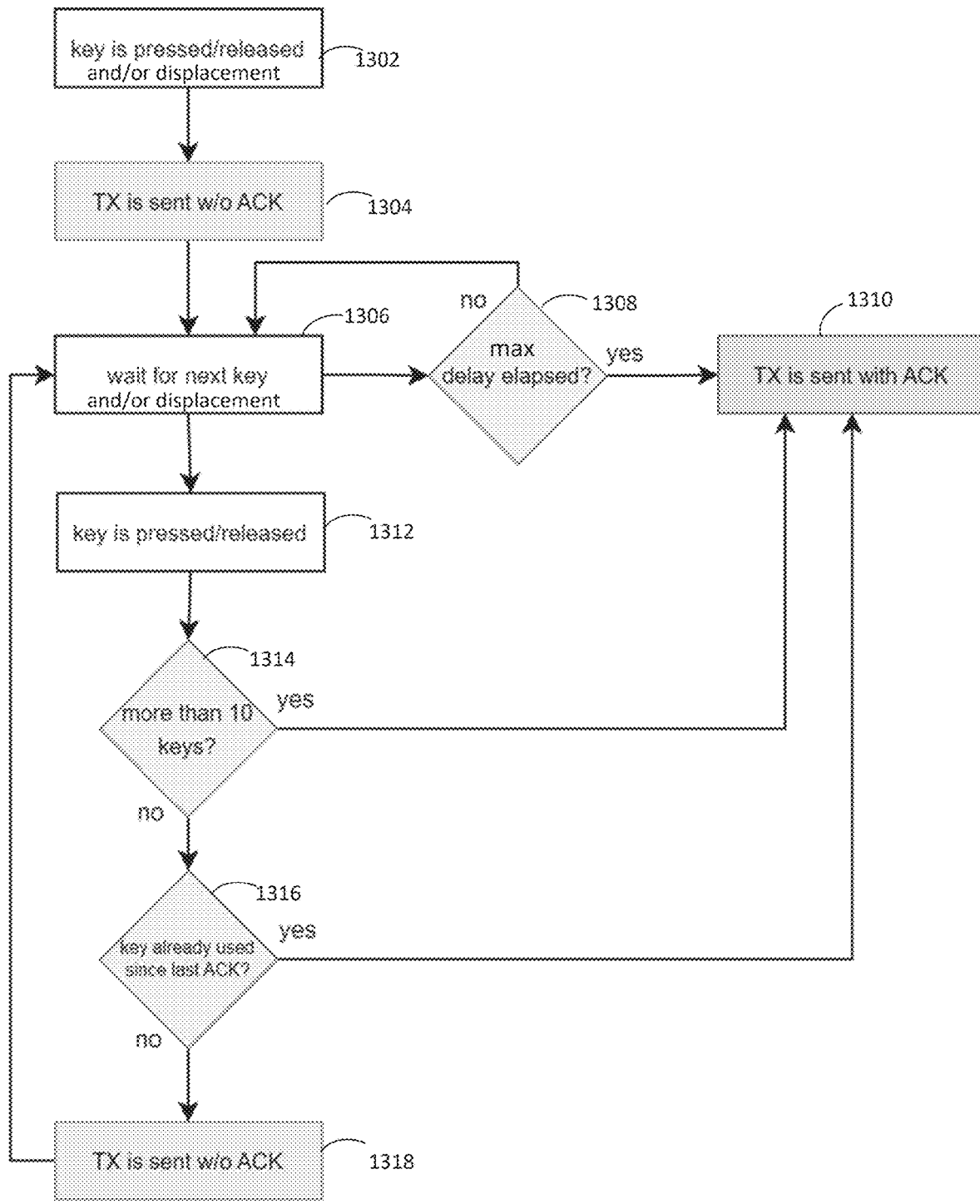
FIG. 13 is a flowchart illustrating a method for a sequence of transmitting key data and displacement data without an acknowledgement for every key press/release or displacement, according to embodiments.

FIG. 13 is a flowchart illustrating a method for a sequence of transmitting key data and displacement data without an acknowledgement for every key press or displacement, according to embodiments. In step 1302, a key is pressed or released, or a displacement is detected, as the first event in a sequence. In step 1304, a packet is transmitted to the host with the key and/or displacement data without a request for an acknowledgement. Step 1306 is waiting for a next key event or displacement. Test 1308 determines if a maximum delay has elapsed without a further key event or displacement. If yes, a transmission is sent with all the key presses and releases and displacements in the sequence, requesting an acknowledgement (step 1310). Otherwise, the system waits for the next key press/release 1312. If the key press/release count is more than 10 (step 1314), a transmission is sent with all the key presses and releases and displacements in the sequence, requesting an acknowledgement (step 1310). If 10 events have not been reached, the other test (step 1316) is whether the same key has already been used since the last acknowledgement. A key is used if there has been both a press and release, or release and press, in the same sequence. If the answer is yes, a transmission is sent with all the key presses and releases and displacements in the sequence, requesting an acknowledgement (step 1310). Otherwise, a transmission is sent without an acknowledgement request in step 1318, and the process returns to waiting for a next key or displacement event in step 1306.

In one embodiment, the method of FIG. 13 of no ACK for both displacement and keys is combined with the variable packet size shown in FIG. 12.

It should be appreciated that the specific steps illustrated provide a particular method for no ACK wireless communications, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

In further embodiments, additional steps are performed. In one embodiment, the displacement data includes at least one of x-y-z displacement data, wheel rotation data and cursor button data. In one embodiment, the other input data includes a button or key activation.

In one embodiment, generating a data packet includes varying a size of the reduced-size packet based on a number of bits used to represent an amount of displacement. In one embodiment, including in the reduced-size packet an indication that no acknowledgement should be sent back for a plurality of reduced-size packets.

Another embodiment, adds using a larger number of bits for displacements in a first direction than for displacements in a second direction. In one embodiment, the displacement data includes at least one of data from a joystick or mini-joystick, D-pad, accelerometer, tilt sensor, and steering wheel angle. In another embodiment, the other input data packet contains button activation data for only buttons activated during a time period.

It should be appreciated that the specific packets illustrated in FIG. 12 provide a particular method for reduced size packet wireless communications, according to certain embodiments. Other sequences of packets may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Alternate Embodiments

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method for wireless communications between an input device and a host, the method comprising:
    detecting, by the input device, a key press or release;
    determining whether the same key has been pressed or released since a last acknowledgement;
    when the same key has not been pressed or released since a last acknowledgement, wirelessly transmitting to the host a no-acknowledgement packet with key data for that period and any other key data since the last acknowledgement;
    when the same key has been pressed or released since a last acknowledgement, wirelessly transmitting to the host an acknowledgement request in a packet with key data for that period and any other accumulated key data since the last acknowledgement;
    at a maximum delay time without requesting an acknowledgement, transmitting an acknowledgment request packet including all the key presses since the last acknowledgement; and
    at a threshold number of key events without requesting an acknowledgement, transmitting an acknowledgment request packet including all the key presses since the last acknowledgement.

2. The method of claim 1 wherein the maximum delay time has a lowest value of twice a period of transmission and a highest value of 16 periods of transmission.

3. The method of claim 1 wherein the threshold number of key presses and releases without requesting an acknowledgement is between five and fifteen.

4. The method of claim 1 wherein the key press or release is a change in direction of key movement.

5. The method of claim 1, further comprising, when only displacement data is detected since a last acknowledgement, generating a no-acknowledgement packet with the displacement data.

6. The method of claim 1, wherein the period is 250 microseconds or less, corresponding to 4 kHz or faster.

7. The method of claim 1, wherein the period is 125 microseconds, corresponding to 8 kHz.

8. The method of claim 1 further comprising, requesting an acknowledgement on a dynamic basis, rather than a fixed timing.

9. The method of claim 1 further comprising, when no key has been pressed or released since a last transmission, sending the accumulated key presses and releases since the last acknowledgement to the host during the period following the last transmission.

10. The method of claim 9 further comprising continuing to send packets with the accumulated key presses and releases since the last acknowledgement in the absence of new key presses or releases a number of times corresponding to an amount of noise detected on a transmission channel.

11. The method of claim 1 further comprising varying a size of the no-acknowledgement packet with the number of key presses and releases.

12. A system for wireless communications between an input device and a host, the system comprising:
    an input device;
    an input device transceiver mounted in the input device;
    an input device processor mounted in the input device;
    a key data input mechanism;
    an input device memory coupled to the input device processor, the input device memory including non-transitory computer readable medium having stored thereon software instructions that, when executed by the input device processor, cause the input device processor to execute steps comprising:
    detecting, by the input device, a key press or release;
    determining whether the same key has been pressed or released since a last acknowledgement;
    when the same key has not been pressed or released since a last acknowledgement, wirelessly transmitting to the host a no-acknowledgement packet with key data for that period and any other key data since the last acknowledgement;
    when the same key has been pressed or released since a last acknowledgement, wirelessly transmitting to the host an acknowledgement request in a packet with key data for that period and any other accumulated key data since the last acknowledgement;
    at a maximum delay time without requesting an acknowledgement, transmitting an acknowledgment request packet including all the key presses since the last acknowledgement; and
    at a threshold number of key events without requesting an acknowledgement, transmitting an acknowledgment request packet including all the key presses since the last acknowledgement.

13. The system of claim 12 wherein the maximum delay time has a lowest value of twice a period of transmission and a highest value of 16 periods of transmission.

14. The system of claim 12 wherein the threshold number of key events without requesting an acknowledgement is between five and fifteen.

15. The system of claim 12 wherein, when only displacement data is detected since a last acknowledgement, generating a no-acknowledgement packet with the displacement data.

16. The system of claim 12 further comprising software instructions that, when executed by the input device processor, cause the input device processor to execute steps comprising:
    varying a size of the no-acknowledgement packet with the number of key presses to provide a reduced-size packet.

17. The system of claim 16 further comprising:
    a host transceiver in communication with the host;
    a host transceiver processor;
    a host transceiver memory coupled to the host transceiver processor, the host transceiver memory including non-transitory computer readable medium having stored thereon software instructions that, when executed by the host transceiver processor, cause the host transceiver processor to execute the steps comprising:
    receiving the reduced-size packet;
    converting the reduced-size packet into a standard packet including fields for the other input data; and
    transmitting the standard packet to the host.

18. The system of claim 12 further comprising software instructions that, when executed by the input device processor, cause the input device processor to execute steps comprising:
    when no key has been pressed or released in a period, and there is no new displacement, sending no packet to the host during that period.

19. The system of claim 12 further comprising software instructions that, when executed by the input device processor, cause the input device processor to execute steps comprising:
    when no key has been pressed or released since a last transmission, sending the accumulated key presses since the last acknowledgement to the host during the period 5 following the last transmission.

20. A method for wireless communications between an input device and a host, the method comprising:
    detecting, by the input device, a key press or release;
    determining whether the same key has been pressed or released since a last acknowledgement;
    when the same key has not been pressed or released since a last acknowledgement, wirelessly transmitting to the host a no-acknowledgement packet with key data for that period and any other key data since the last acknowledgement;
    when the same key has been pressed or released since a last acknowledgement, wirelessly transmitting to the host an acknowledgement request in a packet with key data for that period and any other accumulated key data since the last acknowledgement;
    at a maximum delay time without requesting an acknowledgement, transmitting an acknowledgment request packet including all the key presses since the last acknowledgement; and
    at a threshold number of key events without requesting an acknowledgement, transmitting an acknowledgment request packet including all the key presses since the last acknowledgement
    when no key has been pressed or released in a period, and there is no new displacement, sending no packet to the host during that period;

varying a size of the no-acknowledgement packet with the number of key presses;

wherein the maximum delay time has a lowest value of twice a period of transmission and a highest value of 16 periods of transmission;

wherein the threshold number of key events without requesting an acknowledgement is between two and sixteen; and wherein the period is 250 microseconds or less, corresponding to 4 kHz or faster.

* * * * *